(12) United States Patent
Umeda et al.

(10) Patent No.: US 11,835,736 B2
(45) Date of Patent: Dec. 5, 2023

(54) OPTICAL DEVICE ACTUATOR AND LENS BARREL PROVIDED WITH SAME

(71) Applicant: Panasonic Intellectual Property Management Co., Ltd., Osaka (JP)

(72) Inventors: Makoto Umeda, Osaka (JP); Tetsuya Uno, Osaka (JP); Naoki Yoshikawa, Osaka (JP); Takeshi Sakakibara, Osaka (JP); Kenichi Miyamori, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 539 days.

(21) Appl. No.: 16/963,492

(22) PCT Filed: Jan. 25, 2019

(86) PCT No.: PCT/JP2019/002585
§ 371 (c)(1),
(2) Date: Jul. 20, 2020

(87) PCT Pub. No.: WO2019/146771
PCT Pub. Date: Aug. 1, 2019

(65) Prior Publication Data
US 2021/0048682 A1     Feb. 18, 2021

(30) Foreign Application Priority Data

Jan. 26, 2018   (JP) ................... 2018-011605

(51) Int. Cl.
*G02B 27/64* (2006.01)
*G03B 5/00* (2021.01)
(Continued)

(52) U.S. Cl.
CPC .......... *G02B 27/646* (2013.01); *G02B 7/023* (2013.01); *G02B 7/026* (2013.01); *G02B 7/08* (2013.01);
(Continued)

(58) Field of Classification Search
CPC ........ G02B 27/646; G02B 7/04; G02B 7/102; G02B 7/08; G02B 7/021; G02B 7/023;
(Continued)

(56) References Cited

U.S. PATENT DOCUMENTS

2006/0272440 A1   12/2006   Mori
2011/0141340 A1   6/2011   Yumiki
(Continued)

FOREIGN PATENT DOCUMENTS

JP    H11-160599 A    6/1999
JP    H11-194258 A    7/1999
(Continued)

OTHER PUBLICATIONS

International Search Report for corresponding Application No. PCT/JP2019/002585, dated Apr. 16, 2019.
(Continued)

*Primary Examiner* — Ephrem Z Mebrahtu
(74) *Attorney, Agent, or Firm* — Renner, Otto, Boisselle & Sklar, LLP

(57) ABSTRACT

A lens barrel (10) comprises a fixed frame (30), a main shaft guide (40) that is fixed to the fixed frame, a movable frame (33) that moves along the main shaft guide (40), a driver (magnet (32), drive coil (33c)) that moves the movable frame (33) relatively with respect to the fixed frame (30) along the main shaft guide (40), and a vibration imparting unit (36) that imparts vibration to the main shaft guide (40).

18 Claims, 18 Drawing Sheets

(51) Int. Cl.
*G02B 7/02* (2021.01)
*G02B 7/08* (2021.01)
(52) U.S. Cl.
CPC ........ *G03B 5/00* (2013.01); *G03B 2205/0007* (2013.01)
(58) Field of Classification Search
CPC . G02B 7/022; G02B 7/10; G03B 5/00; H04N 5/23287; H04N 5/23248
See application file for complete search history.

(56) References Cited

U.S. PATENT DOCUMENTS

| | | | | |
|---|---|---|---|---|
| 2012/0268642 | A1* | 10/2012 | Kawai | H04N 23/54 359/554 |
| 2013/0193803 | A1* | 8/2013 | Yamasaki | H02N 2/103 310/323.16 |
| 2016/0161828 | A1 | 6/2016 | Lee | |
| 2019/0265432 | A1* | 8/2019 | Kawanabe | G02B 7/023 |

FOREIGN PATENT DOCUMENTS

| | | | |
|---|---|---|---|
| JP | 2006-154847 | A | 6/2006 |
| JP | 2006-350092 | A | 12/2006 |
| JP | 2007-318851 | A | 12/2007 |
| JP | 2009-047730 | A | 3/2009 |
| JP | 2010-98902 | A | 4/2010 |
| JP | 2012-014035 | A | 1/2012 |
| JP | 2012014035 | A * | 1/2012 |
| JP | 2012-133396 | A | 7/2012 |
| JP | 2012-145874 | A | 8/2012 |
| JP | 2012-203019 | A | 10/2012 |
| WO | 2014/091656 | A1 | 6/2014 |

OTHER PUBLICATIONS

Notice of Reasons for Refusal dated Apr. 4, 2023 in corresponding Japanese Patent Application No. 2022-100450.

* cited by examiner

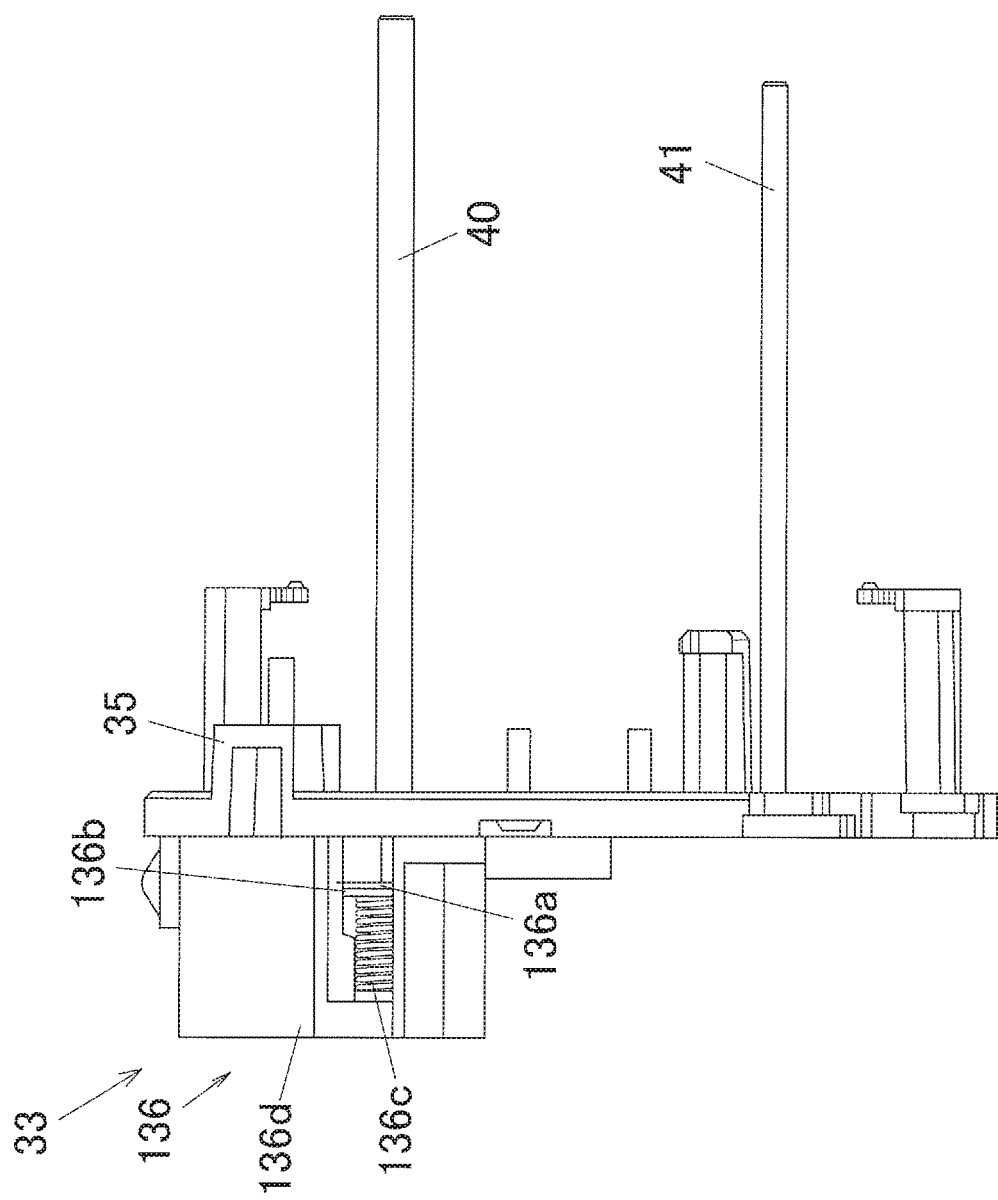

OPTICAL DEVICE ACTUATOR AND LENS BARREL PROVIDED WITH SAME

TECHNICAL FIELD

The present disclosure relates to an optical device actuator, and to a lens barrel comprising this actuator.

BACKGROUND ART

Various mechanisms have been used in recent years as optical device actuators that move lenses and other such optical components along the optical axis direction.

For instance, Patent Literature 1 discloses that in a configuration of a linear actuator having a drive magnet and a drive coil, there is a movement mechanism for an imaging device comprising a piezoelectric element that is deformed when a drive voltage is applied and that restricts movement of a driven body during deformation.

CITATION LIST

Patent Literature

Patent Literature 1: JP-A 2006-350092

SUMMARY

Technical Problem

However, the following problems are encountered with the conventional movement mechanism for an imaging device described above.

With the movement mechanism for a image pickup apparatus disclosed in the above publication, a piezoelectric element is used to hold the position of the driven body at the movement position while saving power. However, this configuration does not take into account the frictional resistance generated between the driven body and the guide shaft when the driven body is moved. Therefore, if the frictional resistance is high, it is difficult to accurately control the position of the driven body.

Also, when there is static friction and dynamic friction, a so-called stick-slip phenomenon occurs due to transition from a static friction state to a dynamic friction state, which makes it even more difficult to accurately control the position of the driven body.

That is, in order to accurately control the movement of the driven body by means of the drive force imparted in a linear actuator, the frictional resistance generated between the driven body and the guide shaft is preferably minimized when moving the driven body. It is also preferable to minimize the occurrence of the stick-slip phenomenon.

In particular, as the resolution of imaging elements installed in imaging devices has risen in recent years, there is a growing need for greater accuracy in convergence to the target position when moving a lens frame for focus adjustment during photography, and in conformity to periodic vibration (wobbling operation) imparted for the sake of a focus scanning operation during moving picture photography.

It is an object of the present disclosure to provide an optical device actuator with which the frictional resistance of a movable frame with respect to a guide shaft is reduced, and the stick-slip phenomenon is also reduced, so that position control of the movable frame can be carried out at high speed and with high accuracy, as well as a lens barrel comprising this actuator.

Solution to Problem

The optical device actuator disclosed herein comprises a fixed frame, a guide shaft that is held by the fixed frame, a movable frame that moves along the guide shaft, a driver that moves the movable frame relative to the fixed frame along the guide shaft, and a vibration imparting unit that imparts vibration to the guide shaft.

Advantageous Effects

The optical device actuator disclosed herein reduces the frictional resistance of a movable frame with respect to a guide shaft, so that position control of the movable frame can be performed at high speed and with high accuracy.

BRIEF DESCRIPTION OF DRAWINGS

FIG. 13 is a side view of the configuration of a vibration imparting unit installed in a lens barrel according to another embodiment of the present disclosure;

DESCRIPTION OF EMBODIMENTS

Embodiments will now be described in detail with reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

A lens barrel 10 equipped with an optical device actuator according to an embodiment of the present disclosure will now be described with reference to FIGS. 1 to 12.

(1) Camera Configuration

Figure 1:
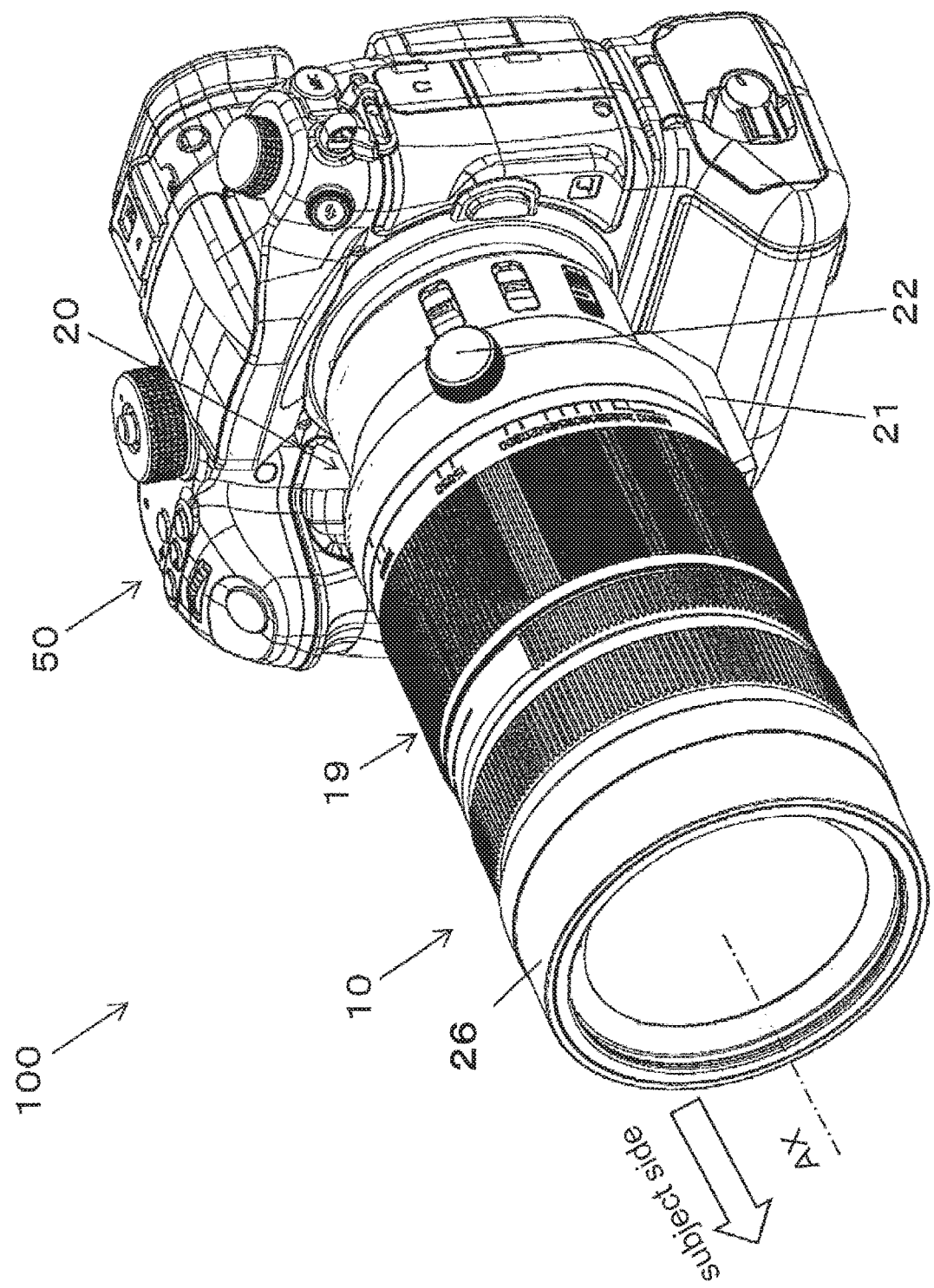
FIG. 1 is an overall oblique view of the configuration of a camera equipped with a lens barrel comprising the optical device actuator according to an embodiment of the present disclosure.

As shown in FIG. 1, a camera 100 according to this embodiment comprises a camera body 50 and the lens barrel 10.

(2) Camera Body Configuration

The camera body 50 comprises an imaging element, a storage unit, and a control unit. The imaging element converts light from the lens barrel 10 into an electric signal. The control unit controls the optical system included in the lens barrel 10 and the imaging element. The storage unit stores the electric signals generated by the imaging element as digital data.

(3) Lens Barrel Configuration

Figure 2:
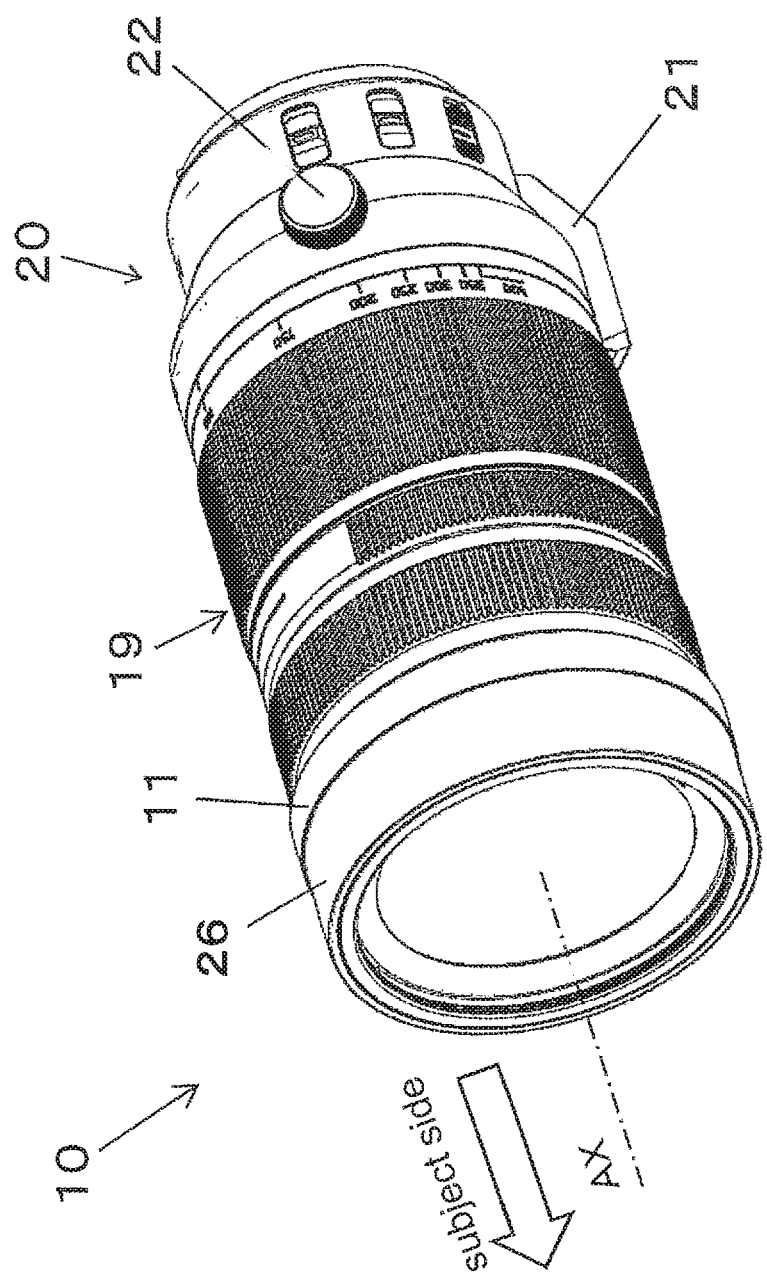
FIG. 2 is an oblique view of the configuration of the lens barrel mounted on the camera in FIG. 1.
Figure 3A:
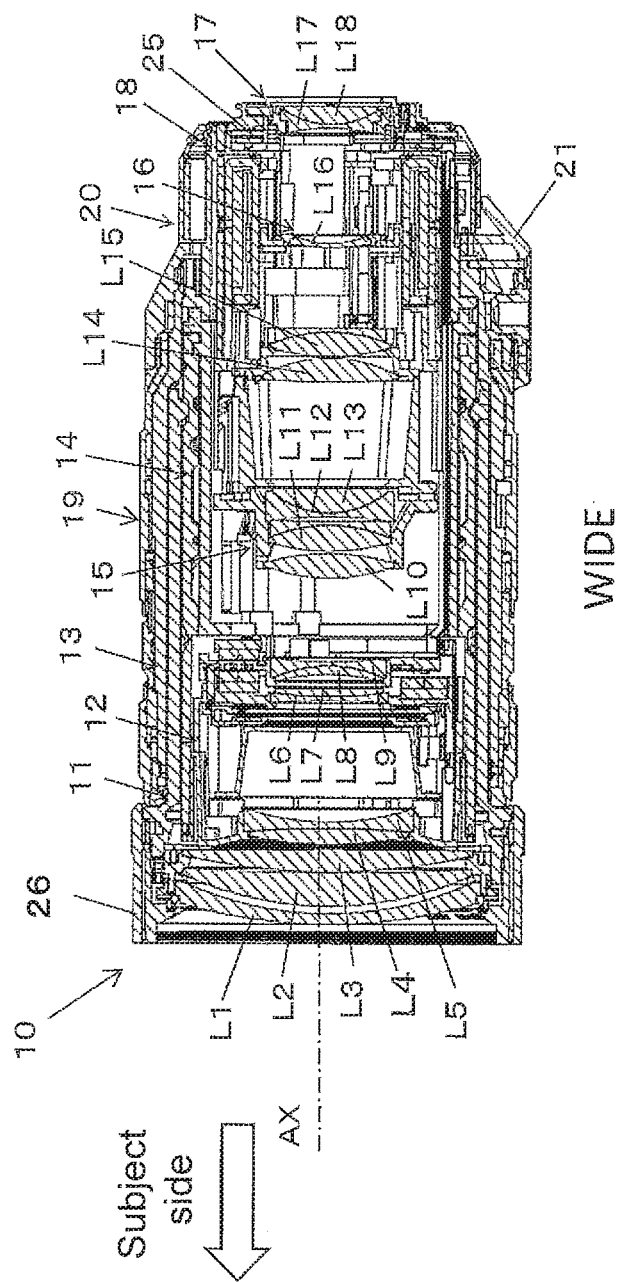
FIG. 3A is a cross section of the lens barrel in FIG. 2.
Figure 3B:
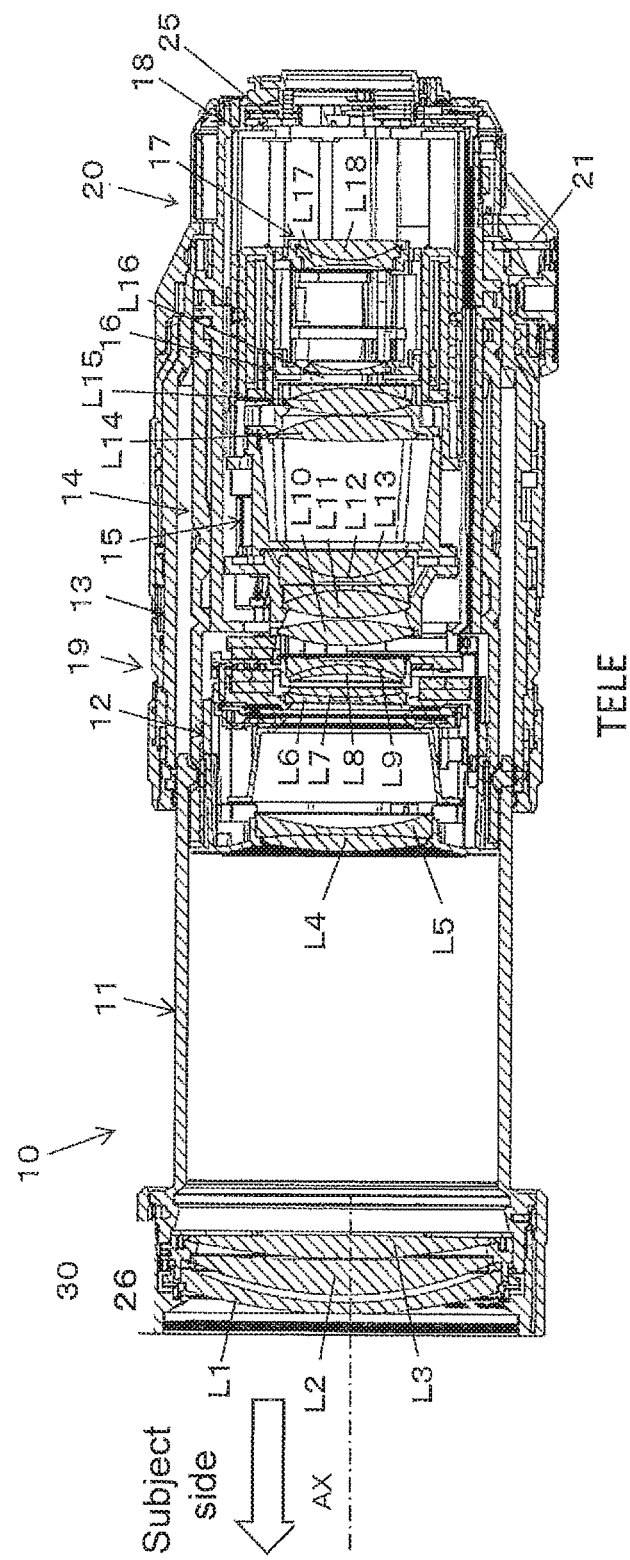
FIG. 3B is a cross section of a state in which the optical system included in the lens barrel in FIG. 2 has moved from the wide-angle side in FIG. 3A to the telephoto side.

As shown in FIGS. 2, 3A, and 3B, the lens barrel 10 according to this embodiment comprises an optical system including lenses L1 to L18, and a first lens group unit 11, a second lens group unit 12, a cam frame 13, a fixed frame 14, a third lens group unit 15, a fourth lens group unit 16, a fifth lens group unit 17, a mounting base 18, an exterior unit 19, a rear frame 20, a tripod base ring 21, a tripod lock screw 22, a circuit board 25, and a lens hood 26. The lens barrel 10 is mounted on the mounting portion of the camera body 50 as shown in FIG. 1.

Here, the optical axis AX direction shown in FIG. 1 is the optical axis direction of the optical system of the lens barrel 10. Hereinafter, the subject side in the optical axis direction means the opposite side from the image plane side on which the imaging element of the camera body 50 is disposed. The optical axis direction of the optical system of the lens barrel 10 shall be referred to as the optical axis AX direction.

As shown in FIGS. 3A and 3B, in the lens barrel 10, the built-in optical system moves along the optical axis AX between the wide-angle side (WIDE position) and the telephoto side (TELE position). This allows variable-power photography.

When the lens barrel 10 is at the WIDE position shown in FIG. 3A, the first lens group unit 11 of the optical system (discussed below) is accommodated on the inner peripheral surface side of the exterior unit 19.

On the other hand, in a state in which the lens barrel 10 is at the TELE position shown in FIG. 3B, the first lens group unit 11 moves to the subject side along the optical axis AX direction and protrudes from the exterior unit 19 toward the subject.

(3-1) Optical System Configuration

Figure 4:
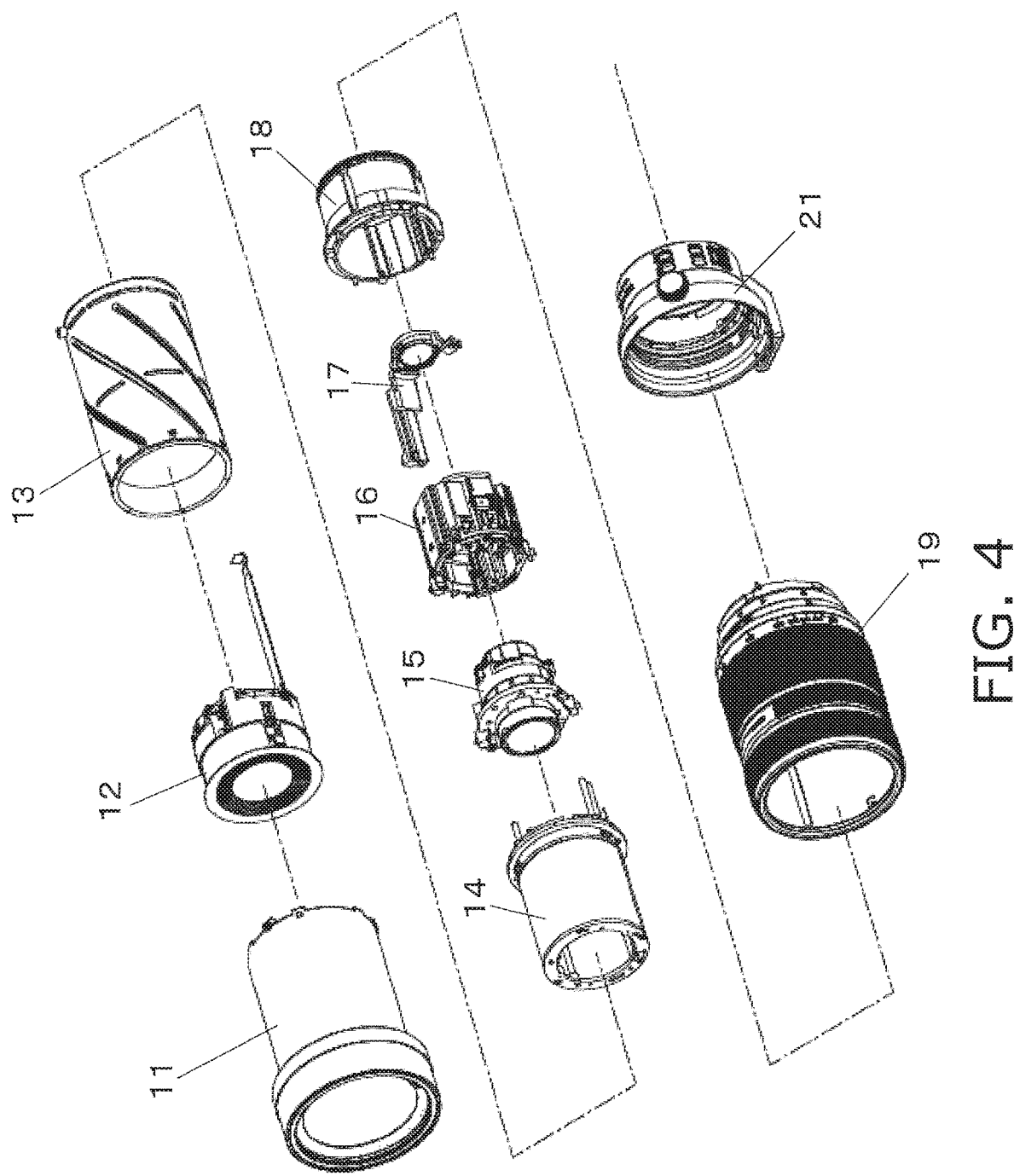
FIG. 4 is an exploded view of the components constituting the lens barrel in FIG. 2.

As shown in FIG. 4, the optical system of the lens barrel 10 is made up of the first lens group unit 11, the second lens group unit 12, the cam frame 13, the fixed frame 14, the third lens group unit 15, the fourth lens group unit 16, the fifth lens group unit 17, the mounting base 18, the exterior unit 19, the rear frame 20, and so on.

The first lens group unit 11 is a cylindrical member, and lenses L1 to L3 are disposed on the subject side in the interior thereof, as shown in FIGS. 3A and 3B. The first lens group unit 11 moves forward and backward along the optical axis AX in a state in which the lenses L1 to L3 are held on the subject side.

Consequently, the distance between the lenses L1 to L18 varies, allowing wide-angle and telephoto photograph to be performed.

The second lens group unit 12 is a cylindrical member disposed on the inner peripheral surface side of the first lens group unit 11, as shown in FIGS. 3A, 3B, and 4. The second lens group unit 12 holds the lenses L4 to L9. The lenses L4 to L9 are disposed closer to the image plane side in the optical axis AX direction than the lenses L1 to L3.

As shown in FIGS. 3A and 3B, the third lens group unit 15 holds the lenses L10 to L15. The third lens group unit 15 is disposed closer to the image plane side in the optical axis AX direction than the second lens group unit 12. Furthermore, as shown in FIG. 4, the third lens group unit 15 is disposed on the inner peripheral side of the cylindrical fourth lens group unit 16. The third lens group unit 15 is driven by an actuator to move back and forth in the optical axis AX direction while holding the lenses L10 to L15.

The fourth lens group unit 16 is a substantially cylindrical member and holds the lens L16, as shown in FIGS. 3A and 3B. As shown in FIG. 4, the fourth lens group unit 16 is disposed on the downstream side of the third lens group unit 15 when viewed from the subject side in the optical axis AX direction. The lens L16 is disposed closer to the image plane side in the optical axis AX direction than the lenses L10 to L15.

The detailed configuration of the fourth lens group unit 16 will be described below.

The fifth lens group unit 17 holds a lens L17 and a lens L18, as shown in FIGS. 3A and 3B. As shown in FIG. 4, the fifth lens group unit is disposed on the inner peripheral side of the cylindrical fourth lens group unit 16. The lens L17 and the lens L18 are disposed closer to the image plane side in the optical axis AX direction than the lens L16.

Also, the fifth lens group unit 17 is movable in the optical axis AX direction. More specifically, the fifth lens group unit 17 moves back and forth in the optical axis AX direction by being driven by an actuator while holding the lens L17 and the lens L18.

As shown in FIG. 4, the cam frame 13 is a cylindrical member and has cam grooves formed therein. The cam frame 13 is disposed on the outer peripheral surface side of the second lens group unit 12, the third lens group unit 15, the fourth lens group unit 16, and the fixed frame 14. Cam pins provided on the outer peripheral surface of the fourth lens group unit 16 fit into the cam grooves of the cam frame 13.

The cam pins of the fourth lens group unit 16 receive the rotational drive force imparted from a rotational drive source and move along the cam grooves. Consequently, the first lens group unit 11 to the fifth lens group unit 17 can be moved back and forth in the optical axis AX direction.

This allows the distance between the lenses L1 to L18 included in the first lens group unit 11 to the fifth lens group unit 17 to be adjusted, so wide-angle and telephoto photography can be performed.

As shown in FIG. 4, the fixed frame 14 is a cylindrical member and is disposed on the outer peripheral side of the third lens group unit 15 and the fourth lens group unit 16. The fixed frame 14 is disposed on the inner peripheral side of the cam frame 13.

As shown in FIG. 4, the mounting base 18 is a substantially cylindrical member that serves as a base for the lens barrel 10. The fourth lens group unit 16 is fixed to the inner peripheral surface side of the mounting base 18. Also, the cam frame 13 is attached to the mounting base 18 in a relatively rotatable state.

As shown in FIGS. 2 and 4, the exterior unit 19 is a cylindrical member that forms the exterior portion of the lens barrel 10. An annular focus ring, zoom ring, etc., are attached in a rotatable state to the outer peripheral surface of the exterior unit 19.

The rear frame 20 is attached to the end of the exterior unit 19 on the image plane side. The rear frame 20 constitutes the exterior portion of the lens barrel 10 along with the exterior unit 19. The rear frame 20 is attached so as to rotate relative to the mounting base 18 and the exterior unit 19.

The rear frame 20 includes the circuit board 25 shown in FIGS. 3A and 3B, and a flexible board, a switch, etc., electrically connected to the circuit board 25.

A tripod base ring 21 is attached to the outer peripheral surface of the rear frame 20, as shown in FIG. 2. The tripod base ring 21 is a base portion to which a tripod is connected.

Also, as shown in FIG. 2, a tripod lock screw 22 is attached to the outer peripheral surface of the rear frame 20. The rear frame 20 is attached to the mounting base 18 and the exterior unit 19 in a relatively rotatable state. Therefore, the tripod lock screw 22 restricts the relative rotation of the rear frame 20 at a specific position. More specifically, the tripod lock screw 22 restricts the relative rotation of the rear frame 20 by applying a pressing force in a direction intersecting the optical axis AX direction.

(3-2) Configuration of Fourth Lens Group Unit 16

Figure 5:
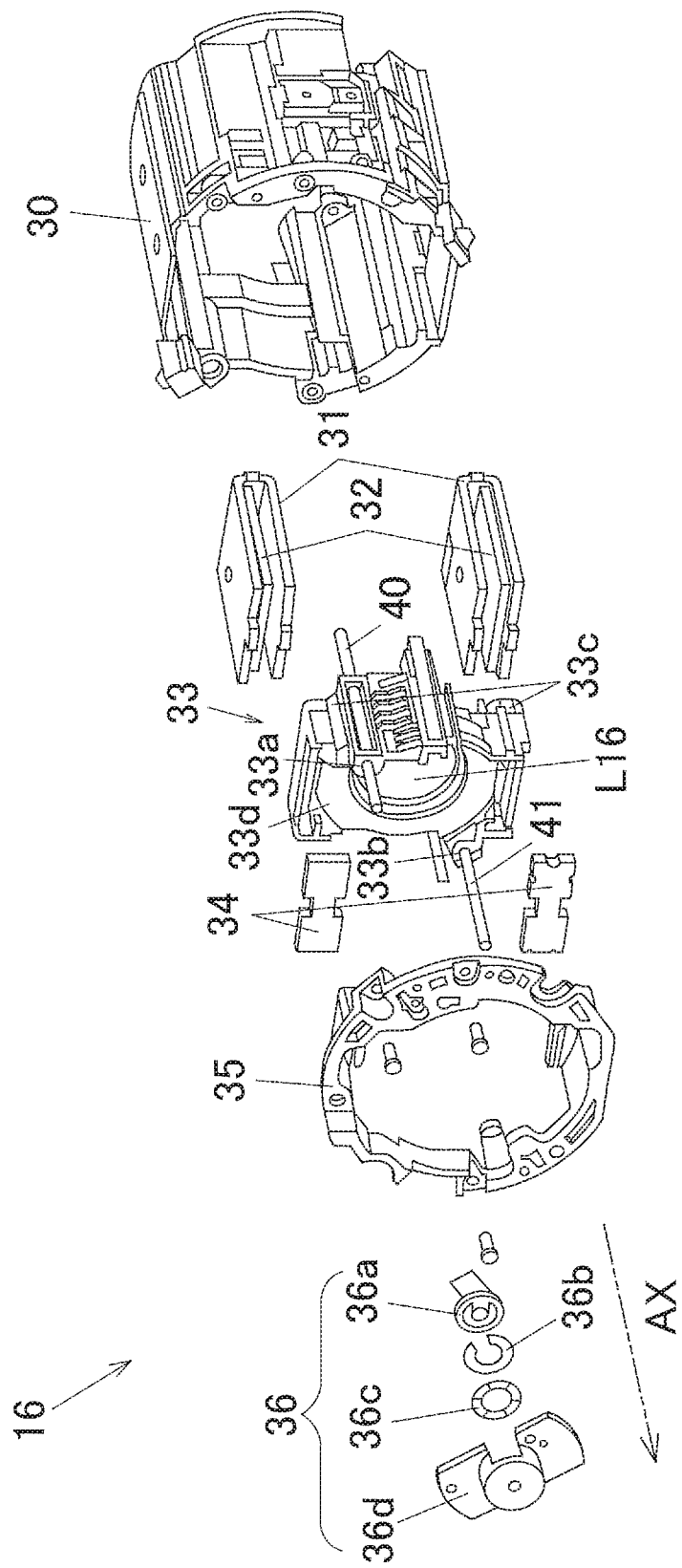
FIG. 5 is an exploded view of the components constituting a fourth lens group unit included in the lens barrel in FIG. 4.

In this embodiment, the fourth lens group unit 16 is used to move the lens L16 held by the movable frame 33 back and forth in the optical axis AX direction, and as shown in FIG. 5, comprises a fixed frame 30, main yokes 31, magnets (drivers) 32, a movable frame 33, a main shaft guide (guide shaft) 40, an auxiliary shaft guide 41, back yokes 34, a guide holding frame 35, a vibration imparting unit 36, and a bias spring (elastic body) 37.

The fixed frame 30 is a substantially cylindrical member that forms the outer shell of the fourth lens group unit 16, and the main yokes 31, the magnets 32, the movable frame 33, the main shaft guide (guide shaft) 40, the auxiliary shaft guide 41, and the like are disposed on the inner peripheral surface side thereof.

Figure 6:
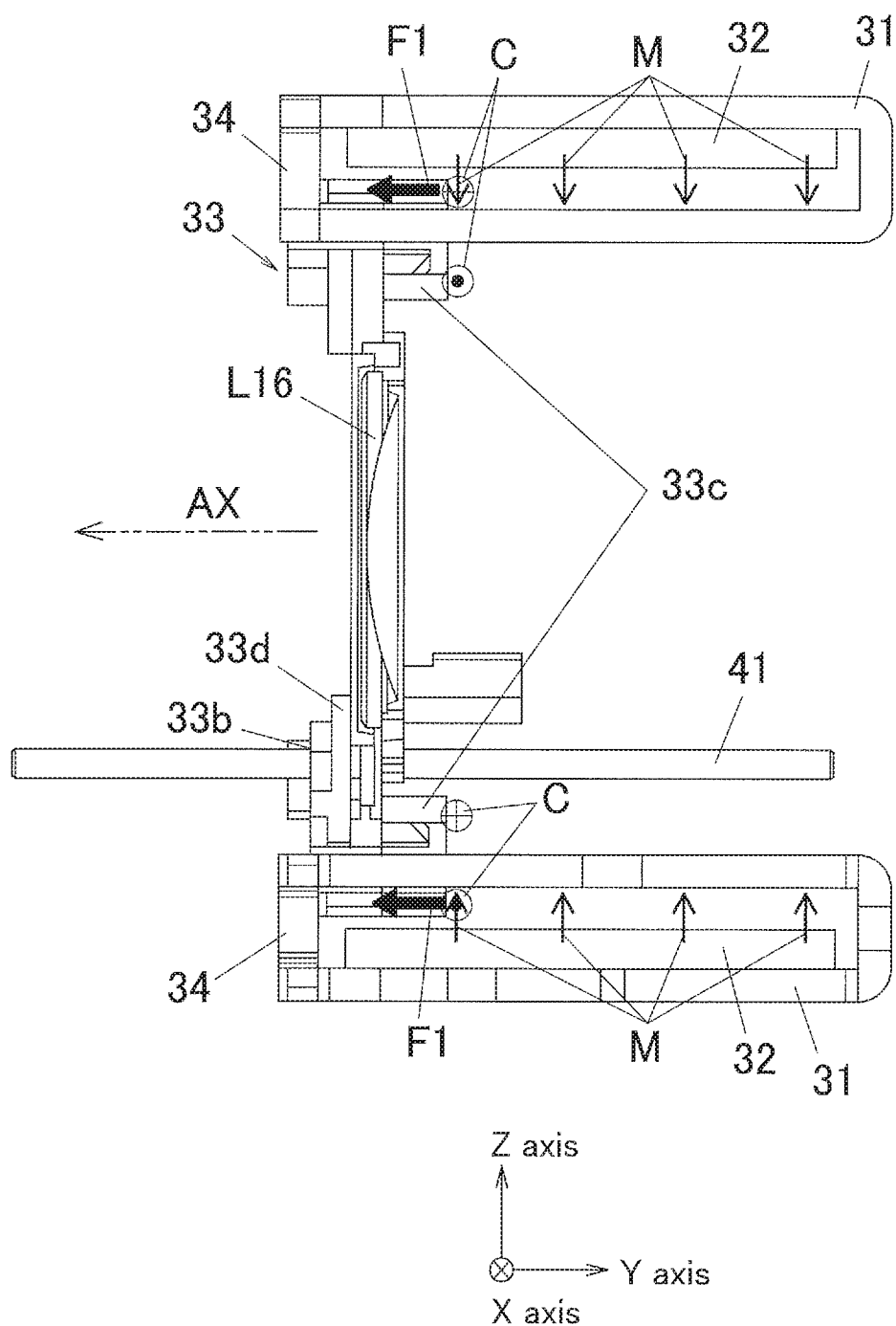
FIG. 6 is a cross section of a configuration in which a propulsive force is imparted to a movable frame in the fourth lens group unit in FIG. 5.

As shown in FIGS. 5 and 6, the main yokes 31 are substantially U-shaped members when viewed from the side, and two of the main yokes 31 are provided at positions opposite each other on the inner peripheral surface side of the fixed frame 30.

As shown in FIGS. 5 and 6, the magnets 32 are provided between the substantially U-shaped portions of the main yokes 31, and constitute an actuator that drives the movable frame 33 together with a drive coil 33c (discussed below). The magnets 32 generate a magnetic field M in the Z direction (inward in the radial direction) indicated by the arrow in FIG. 6. More precisely, the magnet 32 disposed on the upper side in FIG. 6 generates the magnetic field M downward in the drawing, and the magnet 32 disposed on the lower side generates the magnetic field M upward in the drawing.

As shown in FIGS. 5 and 6, the movable frame 33 is movable back and forth in the optical axis AX direction relative to the fixed frame 30, and has a main shaft follower (main guide hole) 33a, an auxiliary shaft follower (auxiliary guide hole) 33b, the drive coil (driver) 33c, and a main body 33d.

The main shaft guide 40 slidably engages with a main shaft follower (main guide hole) 33a, and as shown in FIGS. 5 and 6, is disposed along the optical axis AX direction as a guide member moving the movable frame 33 relative to the fixed frame 30. One end of the main shaft guide 40 in the direction of the optical axis AX is held by the guide holding frame 35 (discussed below) via the vibration imparting unit 36 (discussed below), and the other end is held by the fixed frame 30. Also, when the movable frame 33 is moved, a specific vibration is imparted to the main shaft guide 40 from the vibration imparting unit 36 (discussed below) (see FIG. 7).

Also, since the main shaft guide 40 is vibrated in the axial direction by the specific vibration imparted by the vibration imparting unit 36, it is held so as to be vibratable with respect to the fixed frame 30. More specifically, the main shaft guide 40 fits into a hole in the fixed frame 30 and is held so as to be slidable in the direction of the vibration imparted to the fixed frame 30 from the vibration imparting unit 36, or is held so as to be deformable in the direction of the vibration imparted from the vibration imparting unit 36.

The auxiliary shaft guide 41 is inserted into the auxiliary axis follower (auxiliary guide hole) 33b, is disposed substantially parallel to the main shaft guide 40 as shown in FIGS. 5 and 6, one end in the optical axis AX direction is held by the guide holding frame 35 (discussed below), and the other end is held by the fixed frame 30. The auxiliary shaft guide 41 functions as a guide member for the movable frame 33 so as to maintain the orientation of the movable frame 33 along with the main shaft guide 40 when the movable frame 33 moves back and forth in the optical axis AX direction along the main shaft guide 40.

As shown in FIG. 6, the drive coil 33c is fixed to the main body 33d side of the movable frame 33, and is disposed near the main yokes 31 and the magnets 32 fixed on the fixed frame 30 side. When the movable frame 33 is moved, electrical current flows through the drive coil 33c in the X axis direction perpendicular to the plane of the drawing, as shown in FIG. 6.

Consequently, as shown in FIG. 6, a Lorentz force F1 can be generated in the movable frame 33 in the Y axis direction (to the left) in the drawing by the radially inward magnetic field generated by the magnets 32 and the current flowing through the drive coil 33c. Therefore, when the current flows through the drive coil 33c, the movable frame 33 moves back and forth in the optical axis AX direction.

With the lens barrel 10 in this embodiment, the thrust imparted to the movable frame 33 depends on the Lorentz force F1 generated by the magnets 32 and the drive coil 33c. That is, in this embodiment, the thrust on the movable frame 33 does not depend on the vibration imparted by the vibration imparting unit 36 (discussed below).

As shown in FIG. 6, the main body 33d holds the lens L16 in the central portion. The main shaft follower (main guide hole) 33a and the auxiliary shaft follower (auxiliary guide hole) 33b into which the main shaft guide 40 and the auxiliary shaft guide 41 are inserted are disposed on the outer periphery of the portion of the main body 33d that holds the lens L16.

The back yokes 34 are attached so as to cover the opening portion of the substantially U-shaped main yokes 31.

As shown in FIG. 5, the guide holding frame 35 is disposed on the subject side in the optical axis AX direction of the movable frame 33. The guide holding frame 35 is fixed so as to sandwich the back yokes 34 and so forth between itself and the end surface on the subject side of the fixed frame 30. The guide holding frame 35 holds the vibration imparting unit 36 and the auxiliary shaft guide 41 (discussed below), and holds the main shaft guide 40 via the vibration imparting unit 36.

Figure 7:
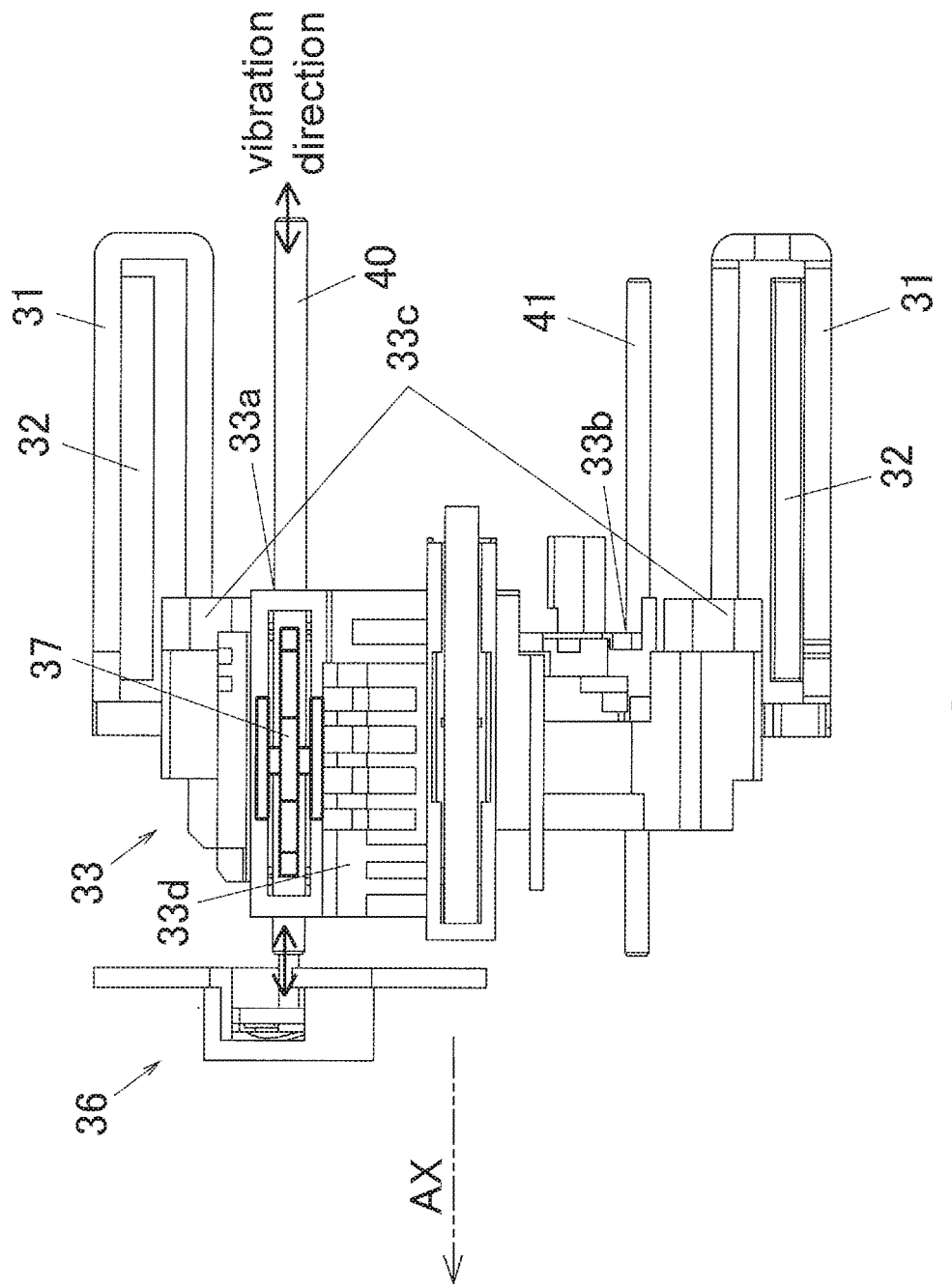
FIG. 7 is a side view of the configuration of the vibration imparting unit that imparts vibration to a main shaft guide in the fourth lens group unit in FIG. 5.
Figure 8:
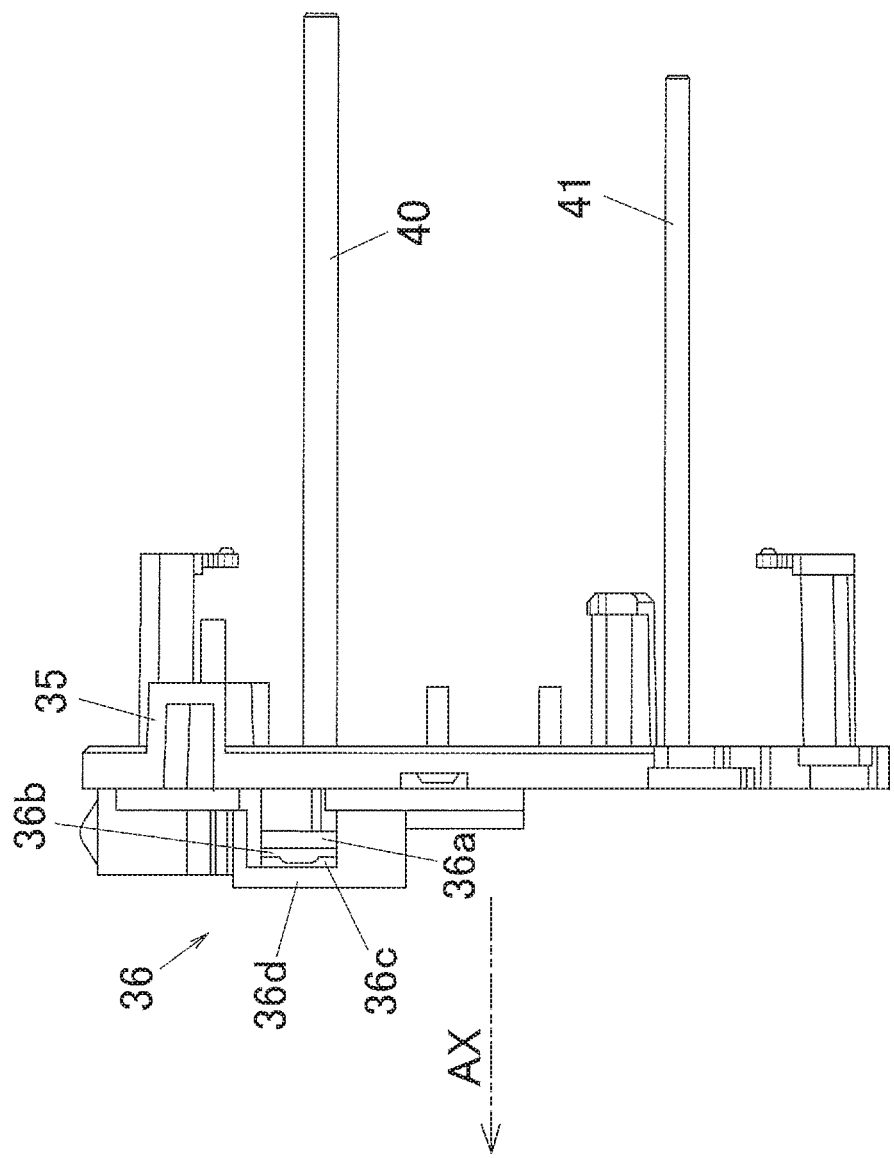
FIG. 8 is a side view of the configuration of the vibration imparting unit in FIG. 7.
Figure 9B:
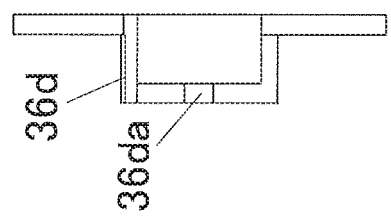
FIG. 9B is a cross section of a spring retainer included in the vibration imparting unit in FIG. 9A.
Figure 9A:
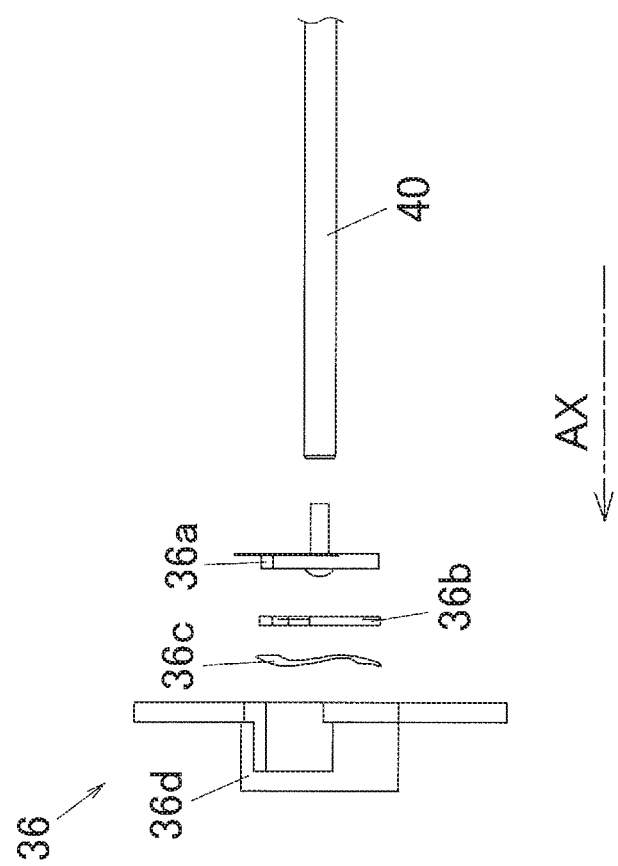
FIG. 9A is an exploded view of the configuration of the vibration imparting unit in FIG. 7.

As shown in FIGS. 7 and 8, the vibration imparting unit 36 is a mechanism that imparts vibration to the main shaft guide 40 along a direction substantially parallel to the axial direction of the main shaft guide 40, and is disposed at a position where the end on the subject side of the main shaft guide 40 comes into contact. The vibration imparting unit 36 imparts vibration so that the main shaft guide 40 and the movable frame 33 slide relatively without moving integrally. Also, the vibration imparting unit 36 has a piezoelectric element 36a, a disk 36b, a spring 36c, and a spring retainer 36d, as shown in FIG. 9A.

The piezoelectric element 36a is an element having a piezoelectric property that generates a force when voltage is applied, and generates ultrasonic vibration by repeatedly expanding and contracting when AC voltage is applied. The piezoelectric element 36a is used as an ultrasonic transducer that imparts a specific ultrasonic vibration to the main shaft guide 40 in order to reduce frictional resistance between the movable frame 33 (main body 33d) and the main shaft guide 40.

Here, in order to generate vibrations at the applied voltage frequency, a voltage having a high frequency that is inaudible to human ears, or that is hard to hear, that is, an ultrasonic frequency of 20 kHz or higher, is applied. As a result, the vibration will be difficult for the human ear to hear, so discomfort of the part of the user can be reduced. Here, the frequency is generally expressed as a frequency.

More specifically, as shown in FIG. 7, the piezoelectric element 36a imparts a specific ultrasonic vibration to the main shaft guide 40 along a direction substantially parallel to the axial direction, so that the static friction generated between the movable frame 33 (main body portion 33d) and the main shaft guide 40 changes to dynamic friction.

Here, if we let $\alpha$ be the acceleration at which the main shaft guide 40 is vibrated by ultrasonic vibration, and mk be the mass of the movable frame 33, the force required for the movable frame 33 to vibrate at the same acceleration $\alpha$ as the main shaft guide 40 is $\alpha \times mk$. The force that can be transmitted from the main shaft guide 40 to the movable frame 33 is the frictional force T acting between the main shaft guide 40 and the movable frame 33.

In a state where $T \geq \alpha \times mk$, the main shaft guide 40 and the movable frame 33 move substantially integrally.

That is, the movable frame 33 vibrates at the acceleration $\alpha$ to match the vibration at the acceleration $\alpha$ of the main shaft guide 40 caused by the piezoelectric element 36a. At this point, the force (frictional force T) that can be transmitted to the movable frame 33 is equal to or greater than the force ($\alpha \times mk$) required to vibrate the movable frame 33 at the acceleration $\alpha$. Therefore, the vibration of the main shaft guide 40 is transmitted to the movable frame 33 at the same acceleration $\alpha$, and the main shaft guide 40 and the movable frame 33 move substantially integrally and do not slide relatively.

On the other hand, in the state where $T < \alpha \times mk$ (relational expression 1), the main shaft guide 40 and the movable frame 33 do not move integrally and relative slip occurs between them.

That is, even if the main shaft guide 40 is vibrated at the acceleration $\alpha$ by the piezoelectric element 36a, the movable frame 33 cannot vibrate at the acceleration $\alpha$, and either does not vibrate or vibrates at an acceleration lower than the acceleration $\alpha$. When vibrating at an acceleration lower than the acceleration $\alpha$, the amplitude of the movable frame 33 will be less than the amplitude of the main shaft guide 40. At this point, the force (frictional force T) that can be transmitted to the movable frame 33 is less than the force ($\alpha \times mk$) required to vibrate the movable frame 33 at the acceleration $\alpha$. Therefore, the vibration of the main shaft guide 40 cannot be transmitted to the movable frame 33 at the same acceleration $\alpha$, and relative slip occurs between the main shaft guide 40 and the movable frame 33.

Also, in a state where $T < \alpha \times mk$, relative slip continues to occur between the main shaft guide 40 and the movable frame 33 the whole time the vibration by the piezoelectric element 36a is continuing. In that state, the friction between the main shaft guide 40 and the movable frame 33 is not static friction, but dynamic friction.

That is, a state of dynamic friction is maintained between the main shaft guide 40 and the movable frame 33 the whole time that the vibration by the piezoelectric element 36a is continuing in the state of $T < \alpha \times mk$. In general, the dynamic frictional force is less than the static frictional force. Therefore, when a state in which dynamic friction is being generated is maintained, the movable frame 33 can be driven with a drive force less than that in a state in which static friction is being generated.

Also, when a state of dynamic friction is being maintained, the so-called stick-slip phenomenon, which is caused by a transition from a state of static friction to a state of dynamic friction when an object starts moving, does not occur. As a result, since a state of dynamic friction is maintained, the object can be moved with a small drive force and without the occurrence of stick-slip, which is advantageous for highly accurate drive at a tiny amount of movement.

Furthermore, in a state where $T < \alpha \times mk$, the movable frame 33 vibrates at an acceleration that is less than the acceleration $\alpha$. That is, the movable frame 33 will sometimes vibrate at an amplitude smaller than that of the main shaft guide 40. This vibration amount is smaller than the amplitude of the main shaft guide 40 and smaller than the amplitude of the piezoelectric element 36a. The amplitude of the piezoelectric element 36a is sufficiently smaller than the precision required for position control of the driven body (the movable frame 33), and is, for example, 1/10 or less. Therefore, even if the driven body (the movable frame 33) is vibrated by the piezoelectric element 36a, there is no problem in terms of position control.

Consequently, the ultrasonic vibration imparted to the main shaft guide 40 from the piezoelectric element 36a can effectively reduce frictional resistance at the portion where the main body 33d of the movable frame 33 is in contact with the main shaft guide 40. As a result, the movable frame 33 can be moved to the desired position quickly and accurately by the Lorentz force F1 (see FIG. 6) generated by the actuator (the magnets 32 and the drive coil 33c) (in this embodiment, a linear actuator).

Here, the ultrasonic vibration imparted from the piezoelectric element 36a to the main shaft guide 40 can be selectively switched between states of being imparted and not imparted to the main shaft guide 40, the purpose of imparting the vibration being a reduction in frictional resistance when a linear actuator or other such actuator drives the main body 33d of the movable frame 33 along the main shaft guide 40. Therefore, this ultrasonic vibration must be started at the same time as the driving by the actuator, or prior to the driving by the actuator. In electrical terms, voltage is applied to the piezoelectric element 36a at the same time as the voltage application to the actuator or before the voltage application to the actuator.

Consequently, the drive force to the linear actuator or other such actuator is imparted to the movable frame 33 in a state of lower frictional resistance between the main body 33d of the movable frame 33 and the main shaft guide 40, so high-speed and highly accurate movement amount control is possible, or control of position, velocity, and acceleration is possible.

Here, when the drive force of the actuator is imparted to the movable frame 33 in a state in which ultrasonic vibration is OFF, that is, a state in which the voltage application to the piezoelectric element 36a is OFF, and high-speed or highly accurate movement amount control is required even while the movable frame 33 is moving, ultrasonic vibration may be started at the same time as this, or prior to it, or at the same position or before the movement, that is, voltage application to the piezoelectric element 36a may be ON.

Conversely, when the drive force of the actuator is imparted to the movable frame 33 in a state in which ultrasonic vibration is ON, that is, a state in which the voltage application to the piezoelectric element 36a is ON, and movement accuracy is not necessary, or is not particularly necessary, even while the movable frame 33 is moving, the ultrasonic vibration may be halted, that is, the voltage application to the piezoelectric element 36a may be turned OFF, at the same time as or prior to this, or at the same position or before this movement. In that case, since voltage is not being applied to the piezoelectric element 36a, a corresponding about of power is saved, and this contributes to reducing the size and increasing the service life of the battery or other such power source. When the required accuracy of movement of the movable frame 33, power consumption, and the like are taken into account, the ultrasonic vibration may be turned ON and OFF, that is, may be selectively switched between a vibration imparting state and a vibration non-imparting state.

When the movable frame 33 is driven by a combination of ultrasonic vibration imparted to the main shaft guide 40 from the piezoelectric element 36a and an actuator such as a linear actuator, the following two states can exist.

The first state is a state in which both ultrasonic vibration and actuator drive are ON, that is, a state in which voltage is being applied to both the piezoelectric element 36a and the actuator. In this state, the movable frame 33 can always move with little frictional resistance, so high-speed and highly accurate movement amount control can be performed. In particular, during reciprocating motion such as wobbling in which the speed and direction of the movable frame 33 change, there are places where the speed drops to zero twice in one cycle of reciprocation. Therefore, problems of movement lag, phase lag, and stick-slip are caused by a change from static friction to dynamic friction at a place where the speed is zero. However, this problem can be ameliorated by establishing this first state at or immediately before the place where the speed of the movable frame 33 drops to zero, that is, at or immediately before the direction reversal point of the reciprocating motion of the movable frame 33.

In this case, if the place where the speed drops to zero is passed, it is possible to move in a state of dynamic friction up to the next direction reversal point. Therefore, during that period, highly accurate movement amount control can be maintained even if the ultrasonic vibration is turned OFF. Thus, if the ultrasonic vibration is turned ON only at the place where the velocity drops to zero, or immediately before that place, or near that place, the electric power imparted to the piezoelectric element 36a can be reduced and power can be saved. During the reciprocating motion of the movable frame 33 in which the speed and direction change, such as wobbling, the first state may always be established, not only at or near the place where the speed of the movable frame 33 drops to zero, but also during wobbling operation or during reciprocating operation in which the speed and direction change. This allows the circuit configuration or the control program to be simplified.

In the first state, the frictional resistance between the main shaft guide 40 and the movable frame 33 is less than that in the case when the ultrasonic vibration is OFF. Therefore, the actuator drive force, that is, the voltage or power applied to the actuator, may be set lower.

The second state is when ultrasonic vibration is OFF and actuator drive is ON, that is, a state in which voltage is not being applied to the piezoelectric element 36a, but is being applied to the actuator. When the movable frame 33 is moving in a state in which there is no speed change in a certain direction, the main shaft guide 40 and the movable frame 33 stay in a state of dynamic friction even in this second state. Therefore, movement lag, phase lag, and stick slip caused by a change from static friction to dynamic friction do not pose a problem. If drive is performed at an actuator driving force that is equal to or higher than the dynamic friction resistance, the above problems are less likely to occur, and stable operation can be performed at high speed and with high accuracy.

When the speed of the movable frame 33 changes or when the movable frame 33 is moved at a low speed, and particularly in the vicinity of the movement starting point and the movement stopping point of the movable frame 33, the speed is lower than in other periods. Therefore, when the actuator drive force is equal to or less than the dynamic friction resistance, the problems of movement lag, phase lag, and stick-slip tend to be caused by a change from static friction to dynamic friction, making it difficult to move stably and with high accuracy. Therefore, it is desirable to establish the first when the speed of the movable frame 33 changes or when the movable frame 33 is moved at a low speed, and particularly near the movement starting point or the movement stopping point of the movable frame 33.

In the second state, the electric power applied to the piezoelectric element 36a can be reduced as compared to when the ultrasonic vibration is ON, so power consumption can be reduced.

In this embodiment, as described above, in the selection between states of imparting and not imparting vibration, the imparting state is selected during the reciprocating operation in which the speed and direction of the movable frame 33 change.

Also, the vibration imparting state is selected at the direction reversal point during reciprocating operation of the movable frame 33, or before the direction reversal point, or near the direction reversal point.

Furthermore, in the selection between states of imparting and not imparting vibration, the imparting state is selected near the movement starting point or the movement stopping point of the movable frame 33.

Furthermore, in the selection between states of imparting and not imparting vibration, the imparting state is selected at the place where the speed of the movable frame 33 drops to zero, before the speed drops to zero, or near where the speed drops to zero.

Next, the effect of ultrasonic vibration on focus blurring will be discussed.

A small value is required for the amount of ultrasonic vibration, that is, the amplitude of ultrasonic vibration, so that focus blurring due to this ultrasonic vibration will not be noticeable. As described above, even if the main shaft guide 40 is vibrated by the piezoelectric element 36a, the movable frame 33 will not vibrate, or the vibration remains, and the vibration is less than the amplitude of the main shaft guide 40, that is, the ultrasonic vibration amount.

As to focus blurring, the conversion formula for the in-focus direction (that is, the optical axis direction) and the out-of-focus direction (that is, the direction perpendicular to the optical axis) is a relation of in-focus direction amount=F value×out-of-focus direction amount. Therefore, in order to make the focus blurring due to the residual vibration amount of the movable frame 33 inconspicuous, it is necessary to satisfy the relationship of S<F×δ×k, where S is the ultrasonic vibration amount, F is the lens F value, δ is the conspicuous blurring amount, and k is the focus movement amount, that is, the focusing lens movement amount with respect to the image plane movement amount.

The conspicuous blurring amount δ here is defined by the resolution limit amount of the imaging element determined by the pixel spacing of the imaging element, or by the amount determined by the permissible circle of confusion determined from the characteristics of the human eye. More specifically, if the F value of the lens is 1.2, the conspicuous blurring amount is 4 μm, and the ratio of the lens movement amount to the focus movement amount is ½, it is necessary to satisfy the relationship of S<2.4 μm.

That is, if we let S be the amplitude of the vibration imparted by the vibration imparting unit 36, δg be the resolution limit amount determined by the pixel spacing of the imaging element, F be the F value of the lens, k be and the ratio of the lens movement amount to the focus movement amount, it is preferable to satisfy the following relational expression (2).

$$S < F \times \delta g \times k \quad (2)$$

Furthermore, if we let S be the amplitude of the vibration imparted by the vibration imparting unit 36, δr be an amount determined by the permissible circle of confusion determined by the characteristics of the human eye, F be the F value of the lens, and k be the ratio of the lens movement amount to the focus movement amount, it is preferable to satisfy the following relational expression (3).

$$S < F \times \delta r \times k \quad (3)$$

The residual vibration amount of the movable frame 33 is preferably less than E, where E is the control resolution that determines the movement accuracy of the focusing lens, that is, the minimum controllable movement amount. To this end, the ultrasonic vibration amount may be set to be less than the control resolution, that is, the minimum controllable movement amount E. More specifically, if we let E be the control resolution, Y be the residual vibration amount, and S be the ultrasonic vibration amount, it is preferable if E>10×Y or E>10×S, but E>2 to 10×Y, or E>2 to 10×S is acceptable.

As described above, a lens may be periodically vibrated (wobbling operation) to adjust the focus when capturing a moving picture. This is a method in which the change in contrast of the image on the imaging element caused by wobbling the lens is used to find the focal position by moving the lens in the direction of higher contrast.

A small value is required for the wobble amount, that is, the amplitude of the periodic vibration, so that focus blurring due to the wobbling operation will not be noticeable. Regarding this focus blurring, the conversion formula for the in-focus direction (that is, the optical axis direction) and the out-of-focus direction (that is, the direction perpendicular to the optical axis) is a relation of the in-focus direction amount=F value×the out-of-focus direction amount. Therefore, if we let W be the wobble amount, F be the F value of the lens, δ be the conspicuous blurring amount, and k be the focus movement amount, that is, the ratio of the lens movement amount to the image plane movement amount, it is necessary to satisfy the relation of W<F×δ×k.

The conspicuous blurring amount δ here is defined by the resolution limit amount of the imaging element determined by the pixel spacing of the imaging element, or by an amount determined by the permissible circle of confusion determined from the characteristics of the human eye. More specifically, if we let the F value of the lens be 1.2, the conspicuous blurring amount be 4 μm, and the ratio of the lens movement amount to the focus movement amount be ½, it is necessary to satisfy the relationship of W<2.4 μm, and in a sliding friction state in which static friction and dynamic friction exist, this is an amount at which position control is nearly impossible. Even during this wobbling operation, high movement accuracy can be obtained by using ultrasonic vibration. At this point, it is preferable to set the amount of ultrasonic vibration, that is, the amplitude of the ultrasonic vibration, so that the residual vibration amount of the movable frame 33 due to ultrasonic vibration will be further less than the wobble amount, that is, the wobbling amplitude, so that the residual vibration amount will not affect the focus adjustment accuracy due to the wobbling operation.

More specifically, if we let W be the wobble amount, Y be the residual vibration amount, and S be the ultrasonic vibration amount, it is preferable to satisfy the relationship of W>10×Y or W>10×S, but it suffices if the relationship of W>2 to 10×Y or W>2 to 10×S is satisfied.

If we let Vw be the frequency of wobbling (the reciprocating frequency of the reciprocating motion in which the speed and direction change), Vs be the frequency of the ultrasonic vibration imparted by the vibration imparting unit 36, and n be an integer, from the viewpoint of preventing the wobbling and the ultrasonic vibration from interfering with each other as undulation, it is preferable for the settings to satisfy the following relational expression (4).

$$Vw \neq Vs, \text{ or } Vs > Vw, \text{ or } Vw \cdot n \neq Vs, \text{ or } Vw \neq (1/n) \times Vs \quad (4)$$

Also, in terms of preventing the ultrasonic vibration from affecting the wobbling accuracy, it is preferable to set the variables such that Vs>Vw. More specifically, it is preferable to satisfy the relationship of Vs>(1000 to 100)×Vw, but it is sufficient to satisfy the relationship of Vs>(10 to 100)×Vw.

Here, the piezoelectric element 36a is, for example, lead zirconate titanate ($Pb(ZrTi)O_3$), barium titanate ($BaTiO_3$), lead titanate ($PbTiO_3$), or another such piezoelectric ceramic.

The term "ultrasonic vibration" here refers to an elastic vibration wave (sound wave) having a high frequency that cannot be heard by the human ear (for example, a sound that the ear does not sense as a stationary sound with a frequency of 20 kHz or more), and in a broader means a sound that is used for some purpose other than being heard by a person, regardless of whether or not a person can actually hear it.

As shown in FIG. 9A, the disk 36b is disposed between the piezoelectric element 36a and the spring 36c. The disk 36b is included inside the cylindrical portion of the spring retainer 36d together with the piezoelectric element 36a and the spring 36c.

The disk 36b is not limited to a member on the other side to which a pressing force is transmitted, and is provided between the spring 36c and the end on the pressing side of the main shaft guide 40 so that the pressing force of the spring 36c will be properly transmitted to the main shaft guide 40.

As shown in FIG. 9A, the spring 36c is a washer type of spring member, and is disposed between the disk 36b and the spring retainer 36d. The spring 36c presses the piezoelectric element 36a via the disk 36b in a direction substantially parallel to the optical axis AX direction. That is, the spring 36c is provided in order to urge the piezoelectric element 36a in a direction that opposes the reaction force produced when the main shaft guide 40 is vibrated.

The piezoelectric element 36a receives the reaction when the main shaft guide 40 is vibrating, that is, when the main shaft guide 40 is being accelerated. If we let ms be the mass of the main shaft guide 40, a reaction of α×ms+T is received. If we let K be the spring multiplier of the spring 36c, x be the amplitude of the vibration imparted from the piezoelectric element 36a, and Fs be the force of the spring 36c, Fs=Kx, and when Fs (=Kx) is sufficiently greater than α×ms+T, the spring 36c hardly bends at all. In this case, the piezoelectric element 36a and the main shaft guide 40 hardly move relative to the spring retainer 36d, the guide holding frame 35, and the fixed frame 30 even when ultrasonically vibrated. In this case, the accuracy required for position control of the driven body (the movable frame 33) can be achieved.

On the other hand, when Fs (=Kx) is sufficiently greater than T but not sufficiently greater than α×ms+T, the spring 36c hardly bends at the frictional force T when the movable frame 33 is driven, but does bend under the reaction of the ultrasonic vibration of the piezoelectric element 36a. Here again, the amount of bending due to the reaction of the ultrasonic vibration will be equal to or less than the amplitude of the piezoelectric element 36a, so the accuracy required for the position control of the movable frame 33 can be achieved.

When Fs (=Kx) is not sufficiently greater than T, the spring 36c will bend by more than the allowable amount due to the frictional force during driving of the movable frame 33, and the accuracy required for position control of the movable frame 33 cannot be achieved.

As shown in FIG. 8, the spring retainer 36d has a disk-shaped flange on the outer periphery of a cylindrical portion that surrounds the piezoelectric element 36a and the like, and is fixed with respect to the guide holding frame 35. As shown in FIG. 9A, the spring retainer 36d surrounds the piezoelectric element 36a, the disk 36b, and the spring 36c in the cylindrical portion. Also, as shown in FIG. 9B, the spring retainer 36d has a hole 36da formed in the central portion of the bottom surface of the cylindrical portion (a plane substantially perpendicular to the optical axis AX direction).

In this embodiment, the vibration imparting unit 36 is controlled so as to impart vibration within a range of 20 to 60 kHz, for example.

Figure 10A:
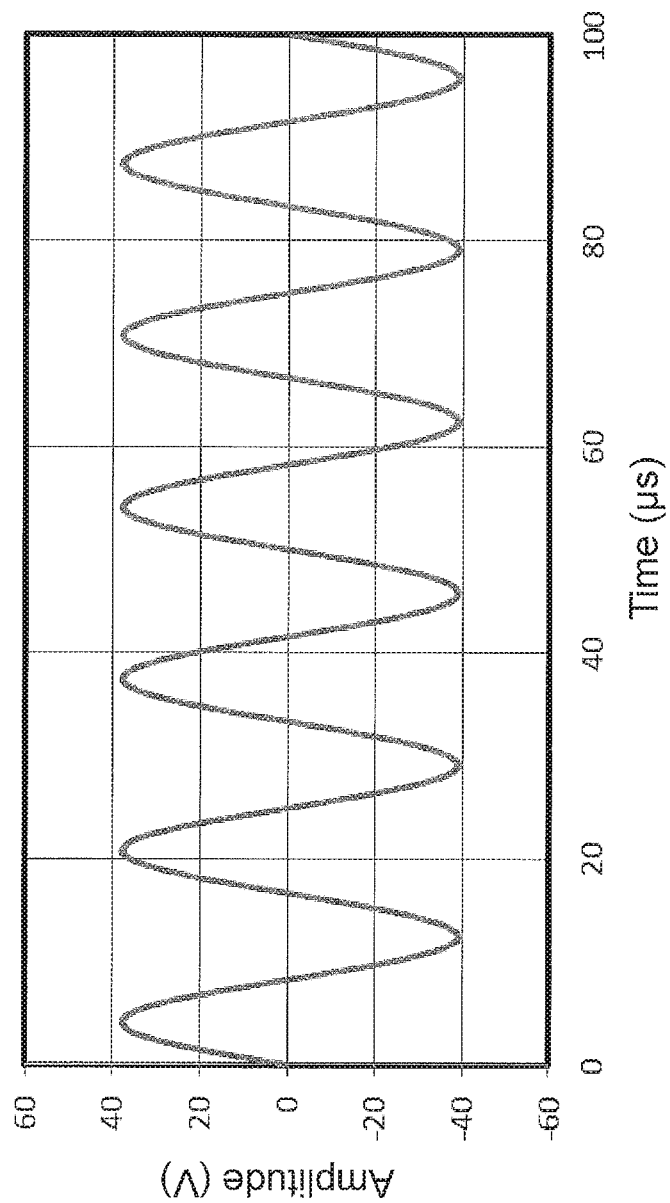
FIG. 10A is a graph showing an example of the waveform of the vibration imparted by the vibration imparting unit included in the fourth lens group unit in FIG. 5.

The ultrasonic vibration imparted by the vibration imparting unit 36 to the main shaft guide 40 may be, for example, vibration (38 V/60 kHz) having a sine wave drive waveform that is in left and right symmetry in the time axis (horizontal axis) direction of the graph, as shown in FIG. 10A.

Here, a "waveform that is in left and right symmetry in the time axis direction of the graph" means a waveform that is in left and right symmetry and has the same gradient on the left and right around a center axis of the time at which the voltage value (V) is the maximum value and the minimum value in the time axis direction.

Figure 10B:
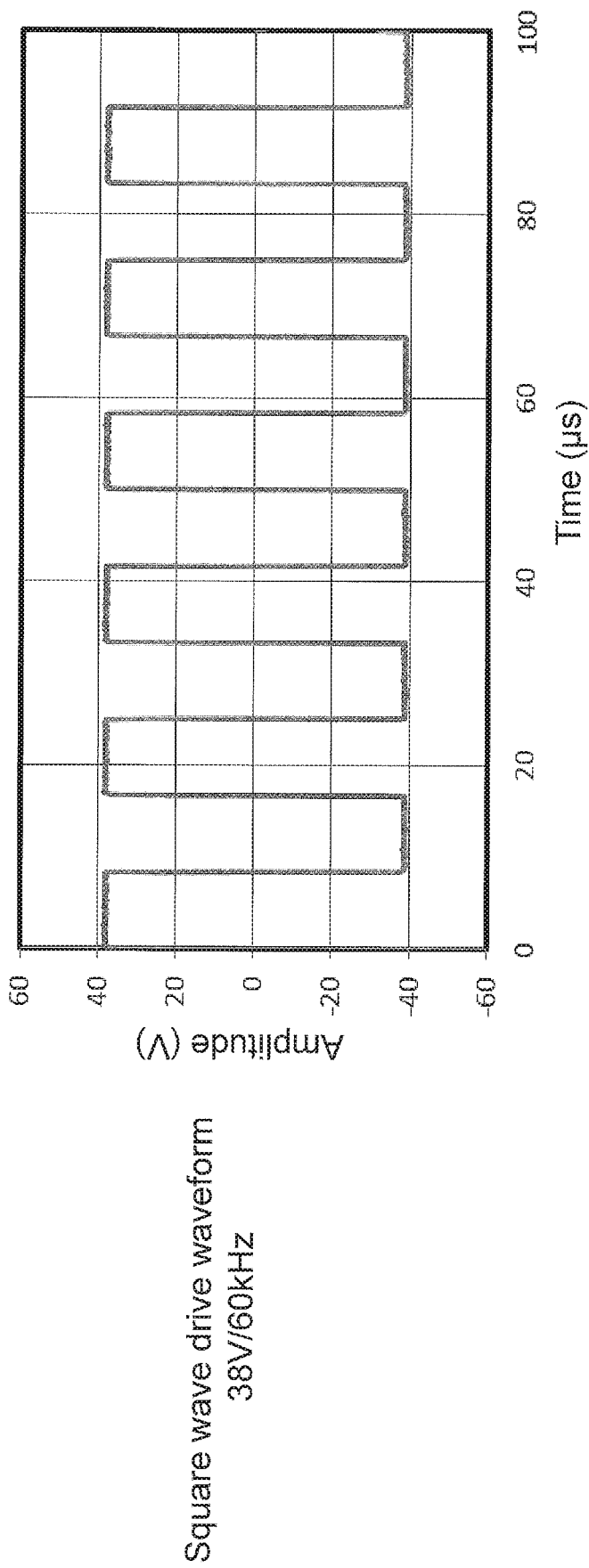
FIG. 10B is a graph showing an example of the waveform of the vibration imparted by the vibration imparting unit included in the fourth lens group unit in FIG. 5.
Figure 10C:
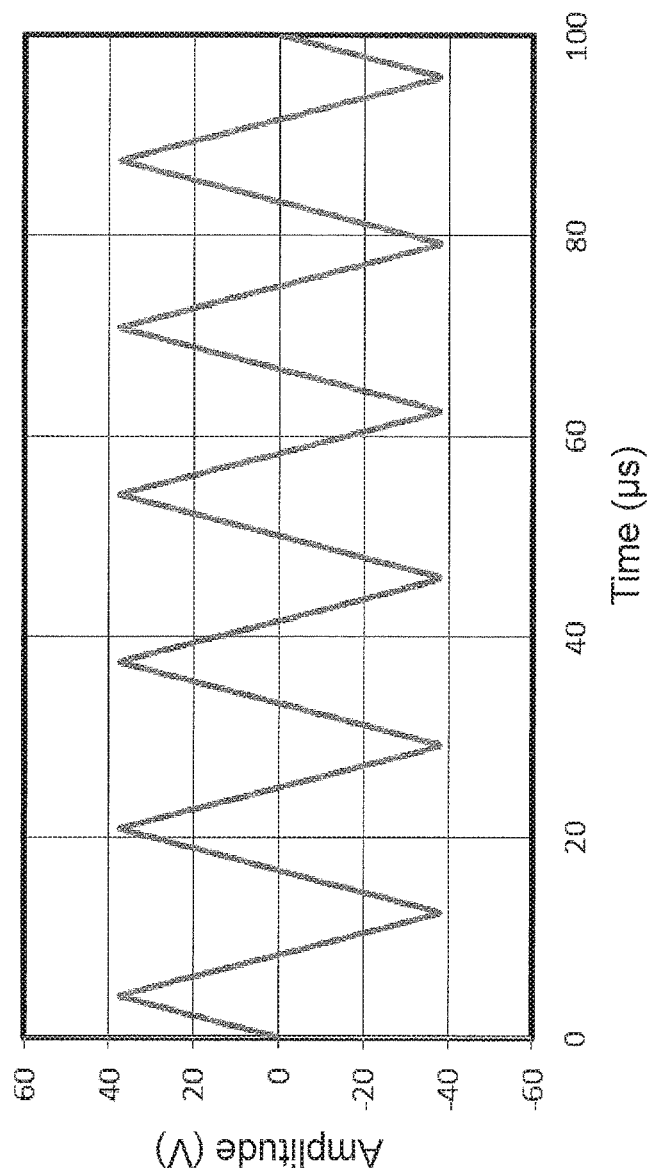
FIG. 10C is a graph showing an example of the waveform of the vibration imparted by the vibration imparting unit included in the fourth lens group unit in FIG. 5.

In addition to the sine wave drive waveform shown in FIG. 10A, the ultrasonic vibration imparted by the vibration imparting unit 36 to the main shaft guide 40 may be vibration (38 V/60 kHz) having the square wave drive waveform shown in FIG. 10B, or vibration (38 V/60 kHz) having the triangular wave drive waveform shown in FIG. 10C.

As shown in FIGS. 10A to 10C, the frictional resistance generated between the movable frame 33 and the main shaft guide 40 can be effectively reduced by imparting vibration having a waveform in left and right symmetry in the time axis (horizontal axis) direction of the graph to the main shaft guide 40 along a direction substantially parallel to the axial direction.

In this embodiment, the vibration imparted by the vibration imparting unit 36 is not imparted in order to move the movable frame 33 in a specific direction, and is instead imparted in order to reduce the frictional resistance generated between the movable frame 33 and the main shaft guide 40. The movable frame 33 then moves back and forth in the X direction in the optical axis A direction along the main shaft guide 40. Consequently, in this embodiment, there is no need to impart vibration having a waveform in left and right asymmetry that is biased in a specific direction.

Figure 11:
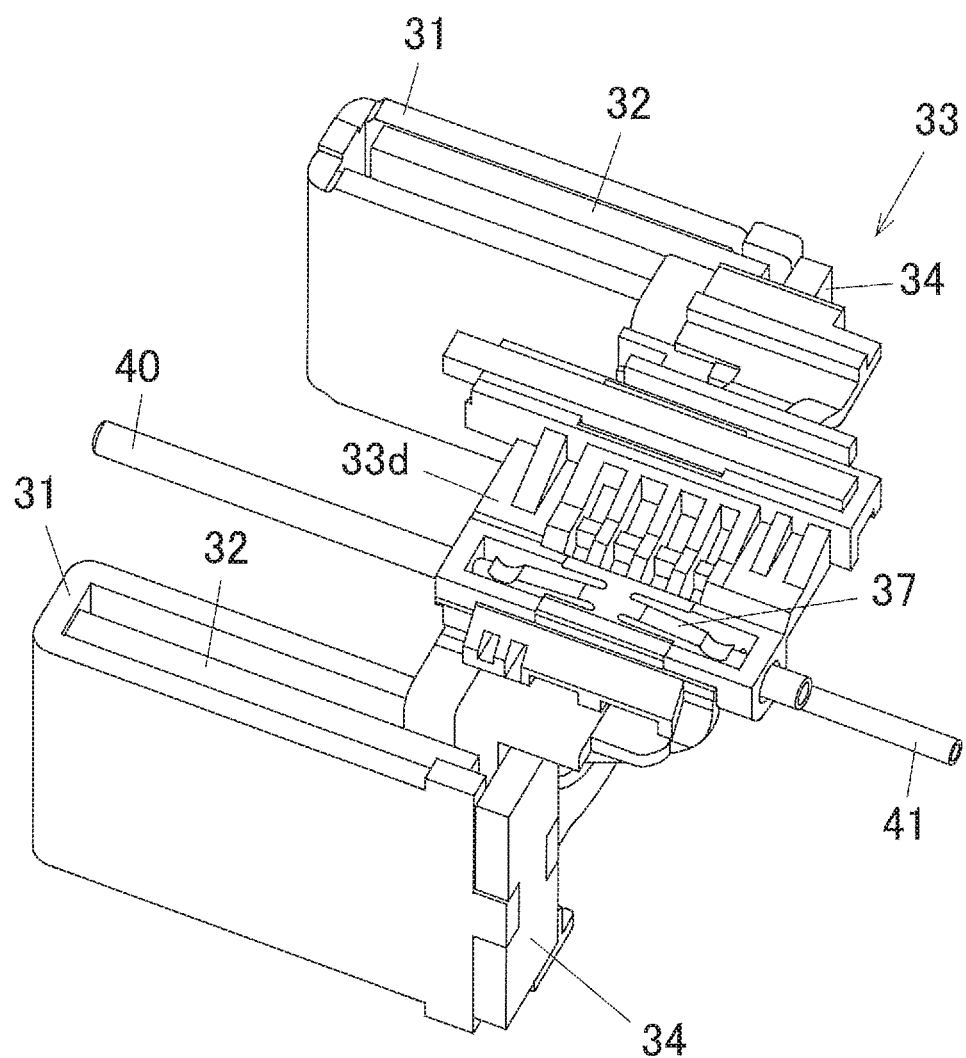
FIG. 11 is an oblique view of a bias spring included in the fourth lens group unit in FIG. 5.

Also, with the lens barrel 10 of this embodiment, the bias spring 37 is provided between the movable frame 33 and the main shaft guide 40 as shown in FIG. 11 in order to stably hold the position of the movable frame 33 in a stationary state.

Figure 12:
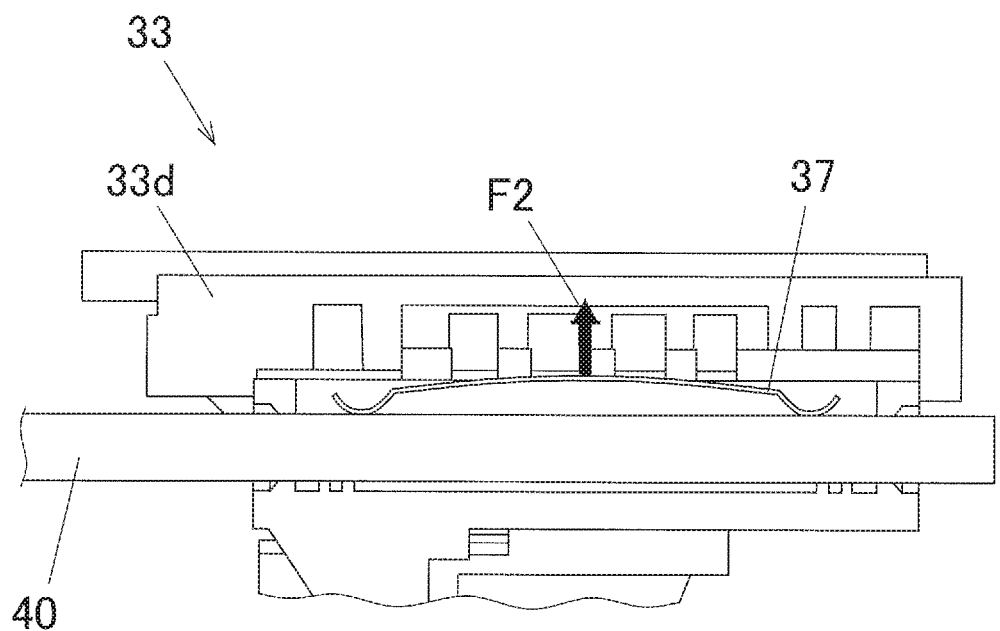
FIG. 12 is a cross section of the portion where the bias spring in FIG. 11 is disposed.

As shown in FIG. 12, the bias spring 37 imparts an urging force F2 in a direction that intersects the main shaft guide 40, and thereby presses a portion of the main body 33d of the movable frame 33 against the main shaft guide 40.

As a result, the movable frame 33 is stably held by a large static friction force between itself and the movable frame 33, even when the lens barrel 10 is subjected to an impart or the like in a stationary state.

On the other hand, when the movable frame 33 is moved with respect to the fixed frame 30, the frictional resistance generated between the main body 33d of the movable frame 33 and the main shaft guide 40 is reduced by ultrasonic vibration imparted from the above-mentioned vibration imparting unit 36 along a direction substantially parallel to the axial direction of the main shaft guide 40.

Consequently, when the movable frame 33 is moved, the frictional resistance generated between the movable frame 33 and the main shaft guide 40 is effectively reduced by the vibration imparting unit 36, allowing the movable frame 33 to be moved in the desired direction, at high speed and with high accuracy, with a smaller force than in the past.

After the movable frame 33 has been moved to the desired position, the vibration of the vibration imparting unit 36 is halted, and frictional resistance generated between the main body 33d of the movable frame 33 and the main shaft guide 40 is increased by the bias spring 37, which allows the movable frame 33 to be held stably in the desired position.

OTHER EMBODIMENTS

An embodiment of the present disclosure was described above, but the present disclosure is not limited to or by the above embodiment, and various modifications can be made without departing from the gist of the disclosure.

(A)

In the above embodiment, an example was given in which the piezoelectric element 36a, the circular plate 36b, the washer-type spring 36c, and the spring retainer 36d were the members constituting the vibration imparting unit 36, but the present disclosure is not limited to this.

For example, a vibration imparting unit 136 having a bias fixing structure for a piezoelectric element 136a including a solenoid-type spring 136c may be employed instead of the washer-type spring 36c.

Figure 14A:
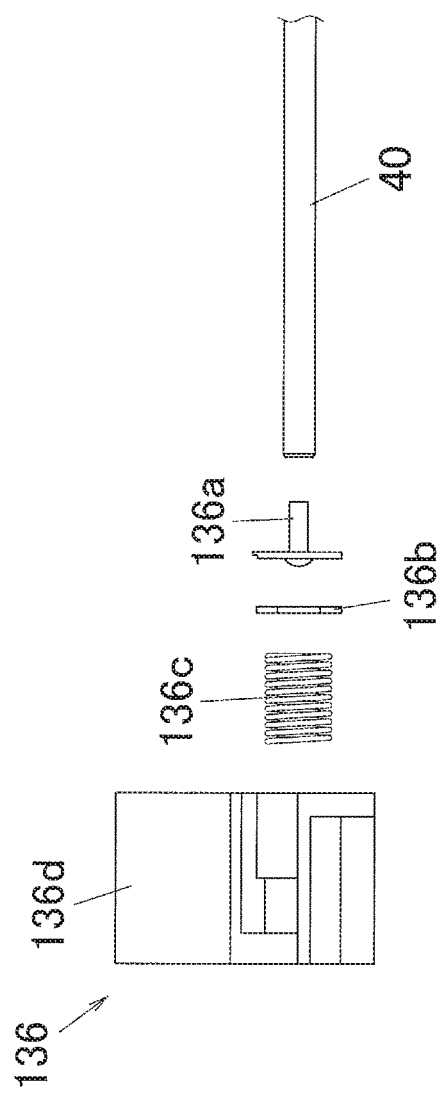
FIG. 14A is an exploded view of the configuration of the vibration imparting unit in FIG. 13.

More specifically, as shown in FIGS. 13 and 14A, the vibration imparting unit 136 has the piezoelectric element 136a, a disc 136b, a spring 136c, and a spring retainer 136d.

The piezoelectric element 136a has the same configuration as the piezoelectric element 36a in the above embodiment.

The disc 136b is disposed between the piezoelectric elements 136a and the spring 136c, as shown in FIG. 14A. The disk 136b is enclosed in the interior of the cylindrical portion of the spring retainer 136d together with the piezoelectric element 136a and the spring 136c.

As shown in FIG. 14A, the spring 136c is a solenoid-type spring member, and is disposed between the disc 136b and the spring retainer 136d. The spring 136c presses the piezoelectric element 136a in a direction substantially parallel to the optical axis AX direction via the disc 136b.

Figure 14B:
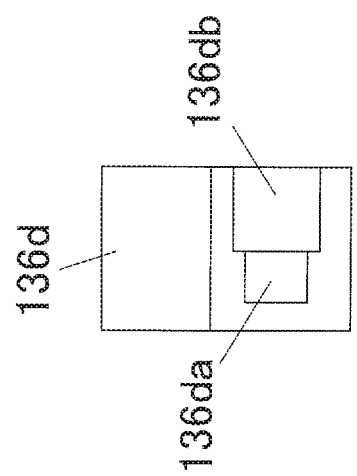
FIG. 14B is a cross section of the spring retainer included in the vibration imparting unit in FIG. 14A.

As shown in FIG. 13, the spring retainer 136d is fixed with respect to the guide holding frame 35. As shown in FIG. 14A, the spring retainer 136d has two holes 136da and 136db of different diameters as shown in FIG. 14B in order to enclose the piezoelectric element 136a, the disc 136b, and the spring 136c.

With the above configuration, the same effect as that of the above embodiment can be obtained.

(B)

In the above embodiment, an example was given in which the optical device actuator of the present disclosure was applied to the fourth lens group unit 16 included in the lens barrel 10 comprising a plurality of lens groups, but the present disclosure is not limited to this.

The object to which the optical device actuator of the present disclosure is applied is not limited to the fourth lens group unit of a lens barrel, for example, and may instead be an actuator that drives an imaging element or another lens frame. For instance, the present disclosure may be applied to an actuator that is used for a lens or an imaging element that is moved for the purpose of image stabilization. In that case, the lens may be moved in a direction perpendicular to the lens optical axis, but the same effect can be obtained with the same configuration.

(C)

In the above embodiment, an example was given in which vibration was imparted by the vibration imparting unit 36 to the main shaft guide 40 along a direction substantially parallel to the axial direction of the main shaft guide 40, but the present disclosure is not limited to this.

The vibration imparted by the vibration imparting unit to the main shaft guide may be imparted along the direction intersecting the axial direction when reducing dynamic friction resistance, for example.

(D)

In the above embodiment, an example was given in which ultrasonic vibration was imparted by the vibration imparting unit 36 to the main shaft guide 40, but the present disclosure is not limited to this.

The vibration imparted by the vibration imparting unit is not limited to ultrasonic vibration, and so long as the vibration reduces the frictional resistance generated between the movable frame and the main shaft guide, vibration in the audible range may be imparted instead, for example.

Also, the ultrasonic vibration imparted by the vibration imparting unit is not limited to the range of 20 to 60 kHz given in the above embodiment, and ultrasonic vibration outside this range may be imparted instead.

(E)

In the above embodiment, an example was given in which the vibration imparted by the vibration imparting unit 36 was vibration having a vibration waveform in left and right symmetry in the time axis (horizontal axis) direction of the graph, as shown in FIGS. 10A to 10C, but the present disclosure is not limited to this.

For instance, the waveform of the vibration imparted by the vibration imparting unit does not necessarily have to be in left and right symmetry in the time axis (horizontal axis) direction of the graph, and may instead be a waveform in left and right asymmetry.

In this case, vibration speed or vibration acceleration will be different on the left and the right sides of the vibration waveform. If we let $\alpha l$ be the acceleration on the left side here, $\alpha r$ be the acceleration on the right side, mk be the mass of the movable frame, and T be the frictional force acting between the guide shaft and the movable frame, if the relationship of $\alpha l \times mk > T > \alpha r \times mk$ is satisfied, then an acceleration al greater than the frictional force T, which is the linking force between the guide shaft and the movable frame, will be exerted on the left side of the waveform, so the guide shaft and the movable frame will slide relatively, and an acceleration $\alpha r$ less than the frictional force T that is the linking force between the guide shaft and the movable frame, will be exerted on the right side of the waveform, so the guide shaft and the movable frame will move integrally. That is, thrust will act on the movable frame in the acceleration direction of the right waveform $\alpha r$.

As described above, there are cases when thrust is imparted to the movable frame due to vibration in left and right asymmetry, but in such a case, the movable frame will be moved by the sum of the thrust attributable to the Lorentz force generated by the magnet and the drive coil, and the thrust attributable to this vibration. If these two thrusts are generated in the same direction, energy efficiency and drive efficiency will both be better.

In this case, thrust is generated in the acceleration direction on the slow side of the vibration acceleration with a waveform in left and right asymmetry, that is, the acceleration direction of $\alpha r$, so the thrust direction of the actuator made up of the magnet and the drive coil may be matched.

(F)

In the above embodiment, an example was given in which the flat bias spring 37 was used as an elastic body that generated frictional resistance between the movable frame 33 and the main shaft guide 40, but the present disclosure is not limited to this.

For example, another elastic body having elastic force, such as a spring or a piece of rubber, may be used as the elastic body that produces frictional resistance between the movable frame and the main shaft guide.

(G)

In the above embodiment, an example was given in which the main shaft guide 40 was held by the guide holding frame 35 via the vibration imparting unit 36, but the present disclosure is not limited to this.

The configuration may be such that the main shaft guide 40 and the vibration imparting unit 36 are held by the guide holding frame 35, and the main shaft guide 40 and the vibration imparting unit 36 are also linked together.

(H)

In the above embodiment, an example was given in which ultrasonic vibration was imparted by the vibration imparting unit 36 to the main shaft guide 40, but the present disclosure is not limited to this.

The configuration may instead be such that a new vibration imparting unit is provided to the auxiliary shaft guide 41, and ultrasonic vibration is imparted to the auxiliary shaft guide.

With the auxiliary shaft guide 41, it is preferable to minimize the frictional resistance generated between the auxiliary shaft guide 41 and the guide shaft when the driven body is moved. It is also preferable to minimize the occurrence of the stick-slip phenomenon.

Just as with a configuration in which the piezoelectric element 36a or 136a is held by the main shaft guide 40, if a new piezoelectric element is attached to the auxiliary shaft guide 41 as an ultrasonic vibrator that imparts a specific ultrasonic vibration, the frictional resistance generated between the movable frame 33 and the auxiliary shaft guide 41 can be reduced. Here, if we let Vm be the frequency of the ultrasonic vibration imparted to the main shaft guide 40, Vf be the frequency of the ultrasonic vibration imparted to the auxiliary shaft guide 41, and n be an integer, it is preferable that the following relational expression (5) is satisfied, in order to prevent the ultrasonic vibrations of the main shaft guide 40 and the auxiliary shaft guide 41 from interfering with each other as undulations.

$$Vm \neq Vf, Vm \neq n \times Vf, Vm \neq (1/n) \times Vf \quad (5)$$

Also, from the viewpoint of reducing the cost of a circuit, it is preferable for the relationship Vm=Vf to be satisfied. This makes it possible for the voltage frequency applied to the piezoelectric elements that create the ultrasonic vibrations of the main shaft guide 40 and the auxiliary shaft guide 41 to be the same. If the applied voltage frequency is the same for both, the circuit scale or program scale can be reduced, and costs can be lowered.

(I)

In the above embodiment, an example was given of a combination of a linear actuator and ultrasonic vibration, but the present disclosure is not limited to this.

For example, instead of using a linear actuator as the drive source, the configuration may be such that ultrasonic vibration is combined with any actuator capable of generating a drive force, such as a stepping motor, a DC motor, an ultrasonic motor, or a voice coil actuator. In this case, the same effect can be obtained as with a configuration in which a linear actuator and ultrasonic vibration are combined.

INDUSTRIAL APPLICABILITY

The optical device actuator of the present disclosure has the effect of reducing frictional resistance between a movable frame and a guide shaft, which allows position control of the movable frame to be performed at high speed and with high accuracy. This makes the present disclosure widely applicable as an actuator that is installed in various kinds of optical device.

REFERENCE SIGNS LIST 10 lens barrel
11 first lens group unit
11a threaded part
12 second lens group unit
13 cam frame
14 fixed frame
15 third lens group unit
16 fourth lens group unit
17 fifth lens group unit
18 mounting base
19 exterior unit
20 rear frame
21 tripod base ring
22 tripod lock screw
25 circuit board
26 lens hood
30 fixed frame
31 main yoke
32 magnet (driver)
33 movable frame
33a main shaft follower (main guide hole)
33b auxiliary shaft follower (auxiliary guide hole)
33c drive coil (driver)
33d main body
34 back yoke
35 guide holding frame
36 vibration imparting unit
36a piezoelectric element
36b disk
36c spring
36d spring retainer
36da hole
37 bias spring (elastic body)
40 main shaft guide (main guide shaft)
41 auxiliary shaft guide (auxiliary guide shaft)
50 camera body
100 camera
136 vibration imparting unit
136a piezoelectric element
136b disk
136c spring
136d spring retainer
136da, 136db hole
F1 Lorentz force
F2 urging force
L1 to L18 lenses
M magnetic force
AX optical axis

The invention claimed is:
1. An optical device actuator, comprising:
a fixed frame;
a guide shaft that is held by the fixed frame;
a movable frame configured to move along the guide shaft;
a driver configured to move the movable frame relative to the fixed frame along the guide shaft; and
a vibration imparting unit configured to impart vibration to the guide shaft, wherein, if we let α be the acceleration of the vibration imparted by the vibration imparting unit to the guide shaft, mk be a mass of the movable frame, and T be a frictional force acting between the guide shaft and the movable frame,
the vibration imparting unit imparts the vibration to the guide shaft so as to satisfy a following relational expression (1):

$$T < \alpha \times mk \tag{1}$$

2. A lens barrel, comprising:
the optical device actuator according to claim 1; and
a plurality of lens groups disposed along an optical axis direction.

3. An optical device actuator, comprising:
a fixed frame;
a guide shaft that is held by the fixed frame;
a movable frame configured to move along the guide shaft;
a driver configured to move the movable frame relative to the fixed frame along the guide shaft; and
a vibration imparting unit configured to impart vibration to the guide shaft,
wherein the vibration can be selectively switched between an imparted state and a non-imparted state with respect to the guide shaft, and
wherein in the selection of the vibration imparted state and non-imparted state, the imparted state is selected during reciprocating operation in which a speed and direction of the movable frame vary.

4. The optical device actuator according to claim 3,
wherein the imparted state is selected at a direction reversal point during reciprocating operation, or before the direction reversal point, or near the direction reversal point.

5. The optical device actuator according to claim 3,
wherein in the selection of the vibration imparted state and non-imparted state, the imparted state is selected at a position where a speed of the movable frame drops to zero, or before the speed drops to zero, or near where the speed drops to zero.

6. The optical device actuator according to claim 3,
wherein the driver and the vibration imparting unit have:
a first state in which the vibration imparting unit and the driver are both in an ON state; and
a second state in which the vibration imparting unit is in an OFF state and the driver is in an ON state.

7. The optical device actuator according to claim 3,
wherein, if we let S be an amplitude of vibration imparted by the vibration imparting unit, and W be an amplitude of reciprocating operation in which the speed and direction of the movable frame vary, a relationship of S<W is satisfied.

8. The optical device actuator according to claim 3,
wherein, if we let Vw be a reciprocating frequency of the reciprocating operation in which the speed and direction vary, Vs be a frequency of the vibration imparted by the vibration imparting unit, and n be an integer, a following relational expression (4) is satisfied.

$$Vw \neq Vs, \text{ or } Vs > Vw, \text{ or } Vw \cdot n \times Vs, \text{ or } Vw \neq (1/n) \times Vs \tag{4}$$

9. A lens barrel, comprising:
the optical device actuator according to claim 3; and
a plurality of lens groups disposed along an optical axis direction.

10. An optical device actuator, comprising:
a fixed frame;
a guide shaft that is held by the fixed frame;
a movable frame configured to move along the guide shaft;
a driver configured to move the movable frame relative to the fixed frame along the guide shaft; and
a vibration imparting unit configured to impart vibration to the guide shaft,
wherein the vibration can be selectively switched between an imparted state and a non-imparted state with respect to the guide shaft, and
wherein in the selection of the vibration imparted state and non-imparted state, the imparted state is selected near a movement starting point or a movement stopping point of the movable frame.

11. A lens barrel, comprising:
the optical device actuator according to claim 10; and
a plurality of lens groups disposed along an optical axis direction.

12. An optical device actuator, comprising:
a fixed frame;
a guide shaft that is held by the fixed frame;
a movable frame configured to move along the guide shaft;
a driver configured to move the movable frame relative to the fixed frame along the guide shaft; and
a vibration imparting unit configured to impart vibration to the guide shaft,
wherein, if we let S be an amplitude of vibration imparted by the vibration imparting unit, and E be a minimum amount of controllable movement of a focusing lens, the relationship of S<E is satisfied.

13. The optical device actuator according to 12,
wherein, if we let S be an amplitude of the vibration imparted by the vibration imparting unit, δg be a resolution limit amount determined by the pixel spacing of an imaging element, F be a F value of a lens, and k be a ratio of the amount of lens movement to the amount of focal movement, a following relational expression (2) is satisfied.

$$S < F \times \delta g \times k \tag{2}$$

14. The optical device actuator according to 12,
wherein, if we let S be an amplitude of the vibration imparted by the vibration imparting unit, δr be an amount determined by the permissible circle of confusion determined by the characteristics of the human eye, F be a F value of a lens, and k be a ratio of the amount of lens movement to the amount of focal movement, a following relational expression (3) is satisfied.

$$S < F \times \delta r \times k \tag{3}$$

15. A lens barrel, comprising:
the optical device actuator according to claim 12; and
a plurality of lens groups disposed along an optical axis direction.

16. An optical device actuator comprising:
a fixed frame;
a first guide shaft that is held by the fixed frame;
a second guide shaft that is held by the fixed frame;
a movable frame that has a first guide hole through which the first guide shaft is inserted and a second guide hole through which the second guide shaft is inserted, and configured to move along the first guide shaft or the second guide shaft;

a driver configured to move the movable frame relatively with respect to the fixed frame along the first guide shaft or the second guide shaft;

a first vibration imparting unit configured to impart vibration to the first guide shaft; and a second vibration imparting unit configured to impart vibration to the second guide shaft, wherein, if we let Vm be a frequency of the vibration imparted to the first guide shaft, Vf be a frequency of the vibration imparted to the second guide shaft, and n be an integer, a following relational expression (5) is satisfied.

$$Vm \neq Vf, Vm \neq n \times Vf, \text{ and } Vm \neq (1/n) \times Vf \qquad (5)$$

17. An optical device actuator, comprising:
a fixed frame;
a guide shaft that is held by the fixed frame;
a movable frame configured to move along the guide shaft;
a driver configured to move the movable frame relative to the fixed frame along the guide shaft; and
a vibration imparting unit configured to impart vibration to the guide shaft, wherein the vibration imparting unit has a piezoelectric element and a spring configured to push the piezoelectric element in a direction substantially parallel to an optical axis direction, wherein, if we let α be an acceleration of the vibration imparted to the guide shaft by the vibration imparting unit, K be a spring multiplier, x be an amplitude of the vibration imparted by the vibration imparting unit, ms be a mass of the guide shaft, and T be a frictional force acting between the shaft and the movable frame, the spring multiplier K satisfies a following relational expression (6).

$$Kx >> \alpha \times ms + T \qquad (6)$$

18. The optical device actuator according to claim 17, wherein, if we let K be a spring multiplier, x be an amplitude of the vibration imparted by the vibration imparting unit, and T be a frictional force acting between the guide shaft and the movable frame, the spring multiplier K satisfies a following relational expression (7).

$$Kx >> T \qquad (7)$$

* * * * *